US012711967B2

(12) United States Patent
Li et al.

(10) Patent No.: US 12,711,967 B2
(45) **Date of Patent: *Aug. 18, 2026**

(54) METHOD AND APPARATUS FOR CALCULATING DOWNMIXED SIGNAL AND RESIDUAL SIGNAL

(71) Applicant: HUAWEI TECHNOLOGIES CO., LTD., Shenzhen (CN)

(72) Inventors: Haiting Li, Beijing (CN); Bin Wang, Shenzhen (CN); Zexin Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 218 days.

This patent is subject to a terminal disclaimer.

(21) Appl. No.: 18/603,770

(22) Filed: Mar. 13, 2024

(65) Prior Publication Data

US 2024/0249731 A1 Jul. 25, 2024

Related U.S. Application Data

(63) Continuation of application No. 17/104,425, filed on Nov. 25, 2020, now Pat. No. 11,961,526, which is a (Continued)

(30) Foreign Application Priority Data

May 31, 2018 (CN) ......................... 201810548874.9

(51) Int. Cl.
*G10L 19/008* (2013.01)
*G10L 19/00* (2013.01)
(Continued)

(52) U.S. Cl.
CPC ........ *G10L 19/008* (2013.01); *G10L 19/0208* (2013.01); *G10L 19/08* (2013.01); *G10L 2019/0001* (2013.01)

(58) Field of Classification Search
CPC ... G10L 19/008; G10L 19/0208; G10L 19/08; G10L 2019/0001
See application file for complete search history.

(56) References Cited

U.S. PATENT DOCUMENTS 10,134,403 B2 * 11/2018 Kim ...................... G10L 19/008
10,438,598 B2 * 10/2019 Atti ...................... G10L 19/008
(Continued)

FOREIGN PATENT DOCUMENTS

CN 101197134 A 6/2008
CN 101964189 A 2/2011
(Continued)

OTHER PUBLICATIONS

Bai, Mingsian R., and Geng-Yu Shih. "Upmixing and downmixing two-channel stereo audio for consumer electronics." IEEE Transactions on Consumer Electronics 53.3 (2007): 1011-1019. (Year: 2007).*

(Continued)

*Primary Examiner* — Brian L Albertalli
(74) *Attorney, Agent, or Firm* — WOMBLE BOND DICKINSON (US) LLP

(57) ABSTRACT

An audio signal encoding method is provided. According to the method, if a current frame is a switching frame, a to-be-encoded downmixed signal and a to-be-encoded residual signal of the subband corresponding to the preset frequency band in the current frame are obtained based on a switch fade-in/fade-out factor of a previous frame, an initial downmixed signal and an initial residual signal of the preset frequency band of the current frame.

18 Claims, 15 Drawing Sheets

Related U.S. Application Data continuation of application No. PCT/CN2019/089232, filed on May 30, 2019.

(51) Int. Cl.

| | |
|---|---|
| ***G10L 19/02*** | (2013.01) |
| ***G10L 19/08*** | (2013.01) |

(56) References Cited

U.S. PATENT DOCUMENTS

| | | | | |
|---|---|---|---|---|
| 11,587,572 | B2 | 2/2023 | Wang et al. | |
| 12,243,541 | B2 * | 3/2025 | Buethe | G10L 19/008 |
| 2011/0040556 | A1 * | 2/2011 | Moon | G10L 19/008<br>704/205 |
| 2014/0226822 | A1 | 8/2014 | Engdegard et al. | |
| 2016/0247509 | A1 | 8/2016 | Dick et al. | |
| 2019/0189137 | A1 * | 6/2019 | Disch | G10L 21/038 |

FOREIGN PATENT DOCUMENTS

| | | | |
|---|---|---|---|
| CN | 102157149 | A | 8/2011 |
| CN | 102280107 | A | 12/2011 |
| CN | 102446507 | A | 5/2012 |
| CN | 103098131 | A | 5/2013 |
| CN | 103518386 | A | 1/2014 |
| CN | 103918030 | A | 7/2014 |
| CN | 105765652 | A | 7/2016 |
| CN | 107452387 | A | 12/2017 |
| CN | 107731238 | A | 2/2018 |
| CN | 107742521 | A | 2/2018 |
| EP | 1869668 | A1 | 12/2007 |
| EP | 2375409 | A1 | 10/2011 |
| JP | H0423289 | A | 1/1992 |
| JP | 2007531915 | A | 11/2007 |
| JP | 2008519307 | A | 6/2008 |
| JP | 2016531483 | A | 10/2016 |
| WO | 2011124608 | A1 | 10/2011 |
| WO | 2017125544 | A1 | 7/2017 |
| WO | 2017125563 | A1 | 7/2017 |

OTHER PUBLICATIONS

ISO/IEC FDIS 23003-3:2011(E), Information technology—MPEG audio technologies—Part 3: Unified speech and audio coding. ISO/IEC JTC 1/SC 29/WG 11. Sep. 20, 2011, 291 pages.

Recommendation ITU-T G.711.1,"Wideband embedded extension for ITU-T G.711 pulse code modulation",ITU-T G.711.1,Telecommunication, Standardization Sector of ITU (Sep. 2012), 218 pages.

* cited by examiner

METHOD AND APPARATUS FOR CALCULATING DOWNMIXED SIGNAL AND RESIDUAL SIGNAL

CROSS-REFERENCE TO RELATED APPLICATIONS

This application is a continuation of U.S. patent application Ser. No. 17/104,425, filed on Nov. 25, 2020, which is a continuation of International Application No. PCT/CN2019/089232, filed on May 30, 2019, which claims priority to Chinese Patent Application No. 201810548874.9, filed on May 31, 2018. All of the afore-mentioned patent applications are hereby incorporated by reference in their entireties.

TECHNICAL FIELD

This application relates to the audio field, and more specifically, to a method and an apparatus for calculating a downmixed signal and a residual signal.

BACKGROUND

As quality of life improves, people have increasing demands on high-quality audio. In comparison with a monophonic signal, a stereo signal has a sense of direction and distribution of all sound sources, so that information clarity, intelligibility, and immersive sense can be improved. Therefore, the stereo signal is highly favored by people.

To better transmit a stereo signal on a limited bandwidth, the stereo signal usually needs to be encoded first, and then an encoding-processed bitstream is transmitted to a decoder side. The decoder side performs decoding processing on the received bitstream to obtain a decoded stereo signal, and the decoded stereo signal is used for playback.

There are a plurality of encoding and decoding technologies for a stereo signal. A parameter stereo encoding and decoding technology is a common stereo encoding and decoding technology. In the parameter stereo encoding and decoding technology, after a stereo signal is analyzed, a spatial perception parameter, a downmixed signal, and a residual signal may be obtained.

In a frame processing-based parametric stereo encoding and decoding technology, when a coding rate is comparatively low, for example, when the coding rate is 26 kilobits per second (kbps), 16.4 kbps, 24.4 kbps, or 32 kbps, to improve a spatial sense and stability during playback of an encoded and decoded stereo signal and reduce high-frequency distortion of the stereo signal, when a preset condition is met, a downmixed signal of each frame of a stereo signal may be encoded, and a residual signal of a subband that meets a preset bandwidth range may also be encoded. For example, when the residual signal is encoded, if the preset condition is met, only the residual signal that meets the preset bandwidth range is encoded. If the preset condition is not met, the residual signal is not encoded.

By using this stereo encoding method, encoding statuses of residual signals of two adjacent frames may be inconsistent. For example, a residual signal of a previous frame of the two adjacent frames is in an encoded state, and a residual signal of a current frame of the two adjacent frames is in a non-encoded state. For another example, a residual signal of a previous frame of the two adjacent frames is in a non-encoded state, and a residual signal of a current frame of the two adjacent frames is in an encoded state.

When the encoded statuses of the residual signals of the two adjacent frames are inconsistent, a latter frame of the two frames may be referred to as a switching frame.

When there is a switching frame in a stereo signal encoding process, when the encoded and decoded stereo signal is played back, transition between the switching frame and a previous frame of the switching frame is unsmooth, thereby affecting auditory quality of the encoded and decoded stereo signal.

SUMMARY

This application provides a method and an apparatus for calculating a downmixed signal and a residual signal, to enable transition between a switching frame and a previous frame of the switching frame to be more smooth when an encoded and decoded stereo signal is played back, thereby providing better auditory quality of the encoded and decoded stereo signal.

According to a first aspect, this application provides a method for calculating a downmixed signal and a residual signal. The method includes:

obtaining an initial downmixed signal and an initial residual signal of a subband corresponding to a preset frequency band in a current frame of an audio signal, where the audio signal is a stereo signal;

determining whether a first target frame of the audio signal is a switching frame, where the first target frame is the current frame or a previous frame of the current frame; and if the first target frame is a switching frame, calculating, based on a switch fade-in/fade-out factor of a second target frame, and the initial downmixed signal and the initial residual signal of the subband corresponding to the preset frequency band, a to-be-encoded downmixed signal and a to-be-encoded residual signal of the subband corresponding to the preset frequency band in the current frame, where the second target frame is the current frame or the previous frame of the first target frame, and the switch fade-in/fade-out factor of the second target frame is determined based on a residual signal coding parameter of the second target frame and at least one of an inter-frame energy fluctuation parameter or an inter-frame amplitude fluctuation parameter of the second target frame; and the residual signal coding parameter of the second target frame is used to represent an energy relationship between a downmixed signal and a residual signal of the second target frame, and the inter-frame energy fluctuation parameter or the inter-frame amplitude fluctuation parameter of the second target frame is used to represent an energy or amplitude relationship between a signal of the second target frame and signals of M frames previous to the second target frame, where M is a positive integer.

The first target frame and the second target frame may be a same frame or different frames.

In an embodiment, the residual signal coding parameter of the second target frame is used to represent an energy ratio of the downmixed signal of the second target frame to the residual signal of the second target frame;

the residual signal coding parameter of the second target frame is used to represent an energy difference between the downmixed signal of the second target frame and the residual signal of the second target frame; or the residual signal coding parameter of the second target frame is used to represent a logarithmic energy difference between the downmixed signal of the second target frame and the residual signal of the second target frame.

In an embodiment, the inter-frame energy fluctuation parameter of the second target frame is used to represent a ratio of total energy of the downmixed signal of the second target frame and the residual signal of the second target frame to total energy of a downmixed signal of a previous frame of the second target frame and a residual signal of the previous frame of the second target frame, or the inter-frame energy fluctuation parameter of the second target frame is used to represent a difference between total energy of the downmixed signal of the second target frame and the residual signal of the second target frame and total energy of a downmixed signal of a previous frame of the second target frame and a residual signal of the previous frame of the second target frame;

the inter-frame energy fluctuation parameter of the second target frame may be used to represent a difference between a logarithm of total energy of the downmixed signal of the second target frame and the residual signal of the second target frame and a logarithm of total energy of a downmixed signal of a previous frame of the second target frame and a residual signal of the previous frame of the second target frame;

the inter-frame energy fluctuation parameter of the second target frame is used to represent a ratio of energy of the downmixed signal of the second target frame to energy of a downmixed signal of a previous frame of the second target frame, or the inter-frame energy fluctuation parameter of the second target frame is used to represent a difference between energy of the downmixed signal of the second target frame and energy of a downmixed signal of a previous frame of the second target frame;

the inter-frame energy fluctuation parameter of the second target frame is used to represent a difference between a logarithm of energy of the downmixed signal of the second target frame and a logarithm of energy of a downmixed signal of a previous frame of the second target frame;

the inter-frame energy fluctuation parameter of the second target frame is used to represent a ratio of energy of the residual signal of the second target frame to energy of a residual signal of a previous frame of the second target frame, or the inter-frame energy fluctuation parameter of the second target frame is used to represent a difference between energy of the residual signal of the second target frame and energy of a residual signal of a previous frame of the second target frame; or the inter-frame energy fluctuation parameter of the second target frame is used to represent a difference between a logarithm of energy of the residual signal of the second target frame and a logarithm of energy of a residual signal of a previous frame of the second target frame.

In an embodiment, the inter-frame amplitude fluctuation parameter of the second target frame is used to represent a ratio of a sum of an amplitude sum of the downmixed signal of the second target frame and an amplitude sum of the residual signal of the second target frame to a sum of an amplitude sum of the downmixed signal of the previous frame of the second target frame and an amplitude sum of the residual signal of the previous frame of the second target frame, or the inter-frame amplitude fluctuation parameter of the second target frame is used to represent a difference between a sum of an amplitude sum of the downmixed signal of the second target frame and an amplitude sum of the residual signal of the second target frame and a sum of an amplitude sum of the downmixed signal of the previous frame of the second target frame and an amplitude sum of the residual signal of the previous frame of the second target frame;

the inter-frame amplitude fluctuation parameter of the second target frame is used to represent a difference between a logarithm of a sum of an amplitude sum of the downmixed signal of the second target frame and an amplitude sum of the residual signal of the second target frame and a logarithm of a sum of an amplitude sum of the downmixed signal of the previous frame of the second target frame and an amplitude sum of the residual signal of the previous frame of the second target frame;

the inter-frame amplitude fluctuation parameter of the second target frame is used to represent a ratio of an amplitude sum of the downmixed signal of the second target frame to an amplitude sum of the downmixed signal of the previous frame of the second target frame, or the inter-frame amplitude fluctuation parameter of the second target frame is used to represent a difference between an amplitude sum of the downmixed signal of the second target frame and an amplitude sum of the downmixed signal of the previous frame of the second target frame;

the inter-frame amplitude fluctuation parameter of the second target frame is used to represent a difference between a logarithm of an amplitude sum of the downmixed signal of the second target frame and a logarithm of an amplitude sum of the downmixed signal of the previous frame of the second target frame;

the inter-frame amplitude fluctuation parameter of the second target frame is used to represent a ratio of an amplitude sum of the residual signal of the second target frame to an amplitude sum of the residual signal of the previous frame of the second target frame, or the inter-frame amplitude fluctuation parameter of the second target frame is used to represent a difference between an amplitude sum of the residual signal of the second target frame and an amplitude sum of the residual signal of the previous frame of the second target frame; or the inter-frame amplitude fluctuation parameter of the second target frame is used to represent a difference between a logarithm of an amplitude sum of the residual signal of the second target frame and a logarithm of an amplitude sum of the residual signal of the previous frame of the second target frame.

In an embodiment, the switch fade-in/fade-out factor of the second target frame is determined in the following manner:

when frame_nrg_ratio>NRG_TH1 and res_dmx_ratio<RATIO_TH1, switch_fade_factor=FACTOR_1;

when frame_nrg_ratio<NRG_TH2 and res_dmx_ratio>RATIO_TH2, switch_fade_factor=FACTOR_2; or in another case, switch_fade_factor=FACTOR_3; where frame_nrg_ratio represents the inter-frame energy fluctuation parameter or the inter-frame amplitude fluctuation parameter of the second target frame; NRG_TH1 represents a preset first threshold of the inter-frame energy fluctuation parameter or the inter-frame amplitude fluctuation parameter; NRG_TH2 represents a preset second threshold of the inter-frame energy fluctuation parameter or the inter-frame amplitude fluctuation parameter; res_dmx_ratio represents the residual signal coding parameter of the second target frame; RATIO_TH1, represents a preset first threshold of the residual signal coding parameter; RATIO_TH2 represents a preset second threshold of the residual signal coding parameter; switch_fade_factor represents the switch fade-in/fade-out factor of the second target frame; and FACTOR_1, FACTOR_2, and FACTOR_3 represent preset values; and NRG_TH1>NRG_TH2, RATIO_TH1<RATIO_TH2, and FACTOR_1>FACTOR_3>FACTOR_2.

In an embodiment, the switch fade-in/fade-out factor of the second target frame is determined in the following manner:

when frame_nrg_ratio>NRG_TH1 and res_dmx_ratio<RATIO_TH1;

when frame_nrg_ratio<NRG_TH2 and res_dmx_ratio>RATIO_TH2, switch_fade_factor=(1−frame_nrg_ratio)*rem_dmx_ratio*FADE_FACTOR_2; or in another case, switch_fade_factor=FADE_FACTOR_3; where frame_nrg_ratio represents the inter-frame energy fluctuation parameter or the inter-frame amplitude fluctuation parameter of the second target frame; NRG_TH1 represents a preset first threshold of the inter-frame energy fluctuation parameter or the inter-frame amplitude fluctuation parameter; NRG_TH2 represents a preset second threshold of the inter-frame energy fluctuation parameter or the inter-frame amplitude fluctuation parameter; res_dmx_ratio represents the residual signal coding parameter of the second target frame; RATIO_TH1, represents a preset first threshold of the residual signal coding parameter; RATIO_TH2 represents a preset second threshold of the residual signal coding parameter; switch_fade_factor represents the switch fade-in/fade-out factor of the second target frame; and FADE_FACTOR_1, FADE_FACTOR_2, and FADE_FACTOR_3 represent preset values; and NRG_TH1>NRG_TH2, RATIO_TH1<RATIO_TH2, and FADE_FACTOR_1>FADE_FACTOR_3>FADE_FACTOR_2.

In an embodiment, FADE_FACTOR_3=0.5.

In an embodiment, FADE_FACTOR_1=0.75.

In an embodiment, FADE_FACTOR_2=0.25.

In an embodiment, the calculating, based on a switch fade-in/fade-out factor of a second target frame, the initial downmixed signal, and the initial residual signal, a to-be-encoded downmixed signal and a to-be-encoded residual signal of the subband corresponding to the preset frequency band in the current frame includes:

calculating the to-be-encoded downmixed signal according to formula $\overline{DMX_{i,b}}(k)=DMX_{i,b}(k)+(1-switch\_fade\_factor)*DMX\_comp_{i,b}(k)$; and calculating the to-be-encoded residual signal according to formula $\overline{RES_{i,b}}(k)=switch\_fade\_factor*RES'_{i,b}(k)$; where $\overline{DMX_{i,b}}(k)$ represents a to-be-encoded downmixed signal of a subband b in a subframe i in the current frame; $DMX_{i,b}(k)$ represents an initial downmixed signal of the subband b in the subframe i in the current frame; switch_fade_factor represents the switch fade-in/fade-out factor; $DMX\_comp_{i,b}(k)$ represents a compensated downmixed signal of the subband b in the subframe i in the current frame; $RES'_{i,b}(k)$ represents an initial residual signal of the subband b in the subframe i in the current frame; $\overline{RES_{i,b}}(k)$ represents a to-be-encoded residual signal of the subband b in the subframe i in the current frame; the subband b in the subframe i in the current frame is a subband in the at least one subband corresponding to the preset frequency band; k represents a frequency bin index of the subband b in the subframe i in the current frame; and $0 \le i \le P-1$, where P represents a quantity of subframes included in the current frame.

In an embodiment, $Th1 \le b \le Th2$, $Th1 < b \le Th2$, $Th1 \le b < Th2$, or $Th1 < b < Th2$, where Th1 represents an index value of a subband with a smallest index value in the subband corresponding to the preset frequency band, Th2 represents an index value of a subband with a largest index value in the subband corresponding to the preset frequency band, and $0 \le Th1 < Th2 \le M-1$, where M represents a quantity of the subbands corresponding to the preset frequency band, and $M \ge 2$.

In an embodiment, the determining whether the first target frame is a switching frame includes: determining, based on a residual coding switching flag value of the first target frame, whether the first target frame is a switching frame.

In an embodiment, when the residual coding flag value of the first target frame is unequal to a residual coding flag value of a previous frame of the first target frame, the residual coding switching flag value of the first target frame indicates that the first target frame is a switching frame;

when a residual coding flag value of the first target frame is unequal to a residual coding flag value of a previous frame of the first target frame, and a modification flag value of the residual coding flag of the previous frame of the first target frame indicates that the residual coding flag value of the previous frame of the first target frame has not been modified, the residual coding switching flag value of the first target frame indicates that the first target frame is a switching frame; or when a residual coding flag value of the first target frame is unequal to a residual coding flag value of the previous frame of the first target frame, and a residual coding switching flag of the previous frame of the first target frame indicates that the previous frame of the first target frame is not a switching frame, the residual coding switching flag value of the first target frame indicates that the first target frame is a switching frame; where the residual coding flag value of the first target frame is used to indicate whether a residual signal of the first target frame needs to be encoded, and the residual coding flag value of the previous frame of the first target frame is used to indicate whether a residual signal of the previous frame of the first target frame needs to be encoded.

In an embodiment, the determining whether the first target frame is a switching frame includes:

when a residual coding flag value of the first target frame is unequal to a residual coding flag value of a previous frame of the first target frame, determining that the first target frame is a switching frame, where the residual coding flag value of the first target frame is used to indicate whether a residual signal of the first target frame needs to be encoded, and the residual coding flag value of the previous frame of the first target frame is used to indicate whether a residual signal of the previous frame of the first target frame needs to be encoded.

According to a second aspect, this application provides an apparatus for calculating a downmixed signal and a residual signal. The apparatus includes:

an obtaining module, configured to obtain an initial downmixed signal and an initial residual signal of a subband corresponding to a preset frequency band in a current frame of an audio signal, where the audio signal is a stereo signal;

a determining module, configured to determine whether a first target frame of the audio signal is a switching frame, where the first target frame is the current frame or a previous frame of the current frame; and a calculation module, configured to: if the first target frame is a switching frame, calculate, based on a switch fade-in/fade-out factor of a second target frame, the initial downmixed signal, and the initial residual signal, a to-be-encoded downmixed signal and a to-be-encoded residual signal of the subband corresponding to the preset frequency band in the current frame, where the second target frame is the current frame or the previous frame of the current frame, and the switch fade-in/fade-out factor of the second target frame is determined based on a residual signal coding parameter of the second target frame and at least one of an inter-frame energy fluctuation parameter or an inter-frame amplitude fluctuation parameter of the second target frame; and the residual signal coding parameter of the second target frame is used to represent an energy relationship between a downmixed signal and a residual signal of the second target frame, and the inter-frame energy fluctuation parameter or the inter-frame amplitude fluctuation parameter of the second target frame is used to represent an energy or amplitude relationship between a signal of the second target frame and signals of M frames previous to the second target frame, where M is a positive integer.

In an embodiment, the residual signal coding parameter of the second target frame is used to represent an energy difference between the downmixed signal of the second target frame and the residual signal of the second target frame;

the residual signal coding parameter of the second target frame is used to represent an energy difference between the downmixed signal of the second target frame and the residual signal of the second target frame; or the residual signal coding parameter of the second target frame is used to represent a logarithmic energy difference between the downmixed signal of the second target frame and the residual signal of the second target frame.

In an embodiment, the inter-frame energy fluctuation parameter of the second target frame is used to represent a ratio of total energy of the downmixed signal of the second target frame and the residual signal of the second target frame to total energy of a downmixed signal of a previous frame of the second target frame and a residual signal of the previous frame of the second target frame, or the inter-frame energy fluctuation parameter of the second target frame is used to represent a difference between total energy of the downmixed signal of the second target frame and the residual signal of the second target frame and total energy of a downmixed signal of a previous frame of the second target frame and a residual signal of the previous frame of the second target frame;

the inter-frame energy fluctuation parameter of the second target frame is used to represent a difference between a logarithm of total energy of the downmixed signal of the second target frame and the residual signal of the second target frame and a logarithm of total energy of a downmixed signal of a previous frame of the second target frame and a residual signal of the previous frame of the second target frame;

the inter-frame energy fluctuation parameter of the second target frame is used to represent a ratio of energy of the downmixed signal of the second target frame to energy of a downmixed signal of a previous frame of the second target frame, or the inter-frame energy fluctuation parameter of the second target frame is used to represent a difference between energy of the downmixed signal of the second target frame and energy of a downmixed signal of a previous frame of the second target frame;

the inter-frame energy fluctuation parameter of the second target frame is used to represent a difference between a logarithm of energy of the downmixed signal of the second target frame and a logarithm of energy of a downmixed signal of a previous frame of the second target frame;

the inter-frame energy fluctuation parameter of the second target frame is used to represent a ratio of energy of the residual signal of the second target frame to energy of a residual signal of a previous frame of the second target frame, or the inter-frame energy fluctuation parameter of the second target frame is used to represent a difference between energy of the residual signal of the second target frame and energy of a residual signal of a previous frame of the second target frame; or the inter-frame energy fluctuation parameter of the second target frame is used to represent a difference between a logarithm of energy of the residual signal of the second target frame and a logarithm of energy of a residual signal of a previous frame of the second target frame.

In an embodiment, the inter-frame amplitude fluctuation parameter of the second target frame is used to represent a ratio of a sum of an amplitude sum of the downmixed signal of the second target frame and an amplitude sum of the residual signal of the second target frame to a sum of an amplitude sum of the downmixed signal of the previous frame of the second target frame and an amplitude sum of the residual signal of the previous frame of the second target frame, or the inter-frame amplitude fluctuation parameter of the second target frame is used to represent a difference between and a sum of an amplitude sum of the downmixed signal of the second target frame and an amplitude sum of the residual signal of the second target frame between a sum of an amplitude sum of the downmixed signal of the previous frame of the second target frame and an amplitude sum of the residual signal of the previous frame of the second target frame;

the inter-frame amplitude fluctuation parameter of the second target frame is used to represent a difference between a logarithm of a sum of an amplitude sum of the downmixed signal of the second target frame and an amplitude sum of the residual signal of the second target frame and a logarithm of a sum of an amplitude sum of the downmixed signal of the previous frame of the second target frame and an amplitude sum of the residual signal of the previous frame of the second target frame;

the inter-frame amplitude fluctuation parameter of the second target frame is used to represent a ratio of an amplitude sum of the downmixed signal of the second target frame to an amplitude sum of the downmixed signal of the previous frame of the second target frame, or the inter-frame amplitude fluctuation parameter of the second target frame is used to represent a difference between an amplitude sum of the downmixed signal of the second target frame and an amplitude sum of the downmixed signal of the previous frame of the second target frame;

the inter-frame amplitude fluctuation parameter of the second target frame is used to represent a difference between a logarithm of an amplitude sum of the downmixed signal of the second target frame and a logarithm of an amplitude sum of the downmixed signal of the previous frame of the second target frame;

the inter-frame amplitude fluctuation parameter of the second target frame is used to represent a ratio of an amplitude sum of the residual signal of the second target frame to an amplitude sum of the residual signal of the previous frame of the second target frame, or the inter-frame amplitude fluctuation parameter of the second target frame is used to represent a difference between an amplitude sum of the residual signal of the second target frame and an amplitude sum of the residual signal of the previous frame of the second target frame; or the inter-frame amplitude fluctuation parameter of the second target frame is used to represent a difference between a logarithm of an amplitude sum of the residual signal of the second target frame and a logarithm of an amplitude sum of the residual signal of the previous frame of the second target frame.

In an embodiment, the calculation module is configured to calculate the switch fade-in/fade-out factor of the second target frame in the following manner:

when frame_nrg_ratio>NRG_TH1 and res_dmx_ratio<RATIO_TH1, switch_fade_factor=FACTOR_1;

when frame_nrg_ratio<NRG_TH2 and res_dmx_ratio>RATIO_TH2, switch_fade_factor=FACTOR_2; or in another case, switch_fade_factor=FACTOR_3; where frame_nrg_ratio represents the inter-frame energy fluctuation parameter or the inter-frame amplitude fluctuation parameter of the second target frame; NRG_TH1 represents a preset first threshold of the inter-frame energy fluctuation parameter or the inter-frame amplitude fluctuation parameter; NRG_TH2 represents a preset second threshold of the inter-frame energy fluctuation parameter or the inter-frame amplitude fluctuation parameter; res_dmx_ratio represents the residual signal coding parameter of the second target frame; RATIO_TH1, represents a preset first threshold of the residual signal coding parameter; RATIO_TH2 represents a preset second threshold of the residual signal coding parameter; switch_fade_factor represents the switch fade-in/fade-out factor of the second target frame; and FACTOR_1, FACTOR_2, and FACTOR_3 represent preset values; and NRG_TH1>NRG_TH2, RATIO_TH1<RATIO_TH2, and FACTOR_1>FACTOR_3>FACTOR_2.

In an embodiment, the calculation module is configured to calculate the switch fade-in/fade-out factor of the second target frame in the following manner:

when frame_nrg_ratio>NRG_TH1 and res_dmx_ratio<RATIO_TH1, $$\text{switch\_fade\_factor} = \left(1 - \frac{1}{\text{frame\_nrg\_ratio}}\right) * (1 - \text{rem\_dmx\_ratio}) * \text{FADE\_FACTOR\_1};$$

when frame_nrg_ratio<NRG_TH2 and res_dmx_ratio>RATIO_TH2, switch_fade_factor=(1−frame_nrg_ratio)*rem_dmx_ratio*FADE_FACTOR_2; or in another case, switch_fade_factor=FADE_FACTOR_3; where frame_nrg_ratio represents the inter-frame energy fluctuation parameter or the inter-frame amplitude fluctuation parameter of the second target frame; NRG_TH1 represents a first threshold of the inter-frame energy fluctuation parameter or the inter-frame amplitude fluctuation parameter; NRG_TH2 represents a preset second threshold of the inter-frame energy fluctuation parameter or the inter-frame amplitude fluctuation parameter; res_dmx_ratio represents the residual signal coding parameter of the second target frame; RATIO_TH1, represents a preset first threshold of the residual signal coding parameter; RATIO_TH2 represents a preset second threshold of the residual signal coding parameter; switch_fade_factor represents the switch fade-in/fade-out factor of the second target frame; and FADE_FACTOR_1 FADE_FACTOR_2, and FADE_FACTOR_3 represent preset values; and NRG_TH1>NRG_TH2, RATIO_TH1<RATIO_TH2, and FADE_FACTOR_1>FADE_FACTOR_3>FADE_FACTOR_2.

In an embodiment, FADE_FACTOR_3=0.5.

In an embodiment, FADE_FACTOR_1=0.75.

In an embodiment, FADE_FACTOR_2=0.25.

In an embodiment, the calculation module is specifically configured to:

calculate, according to formula $\overline{DMX_{i,b}}(k)=DMX_{i,b}(k)+(1-\text{switch\_fade\_factor})*DMX\_comp_{i,b}(k)$, the to-be-encoded downmixed signal of the subband corresponding to the preset frequency band; and calculate, according to formula $\overline{RES_{i,b}}(k)=\text{switch\_fade\_factor}*RES'_{i,b}(k)$ the to-be-encoded residual signal of the subband corresponding to the preset frequency band; where $\overline{DMX_{i,b}}(k)$ represents a to-be-encoded downmixed signal of a subband b in a subframe i in the current frame; $DMX_{i,b}(k)$ represents an initial downmixed signal of the subband b in the subframe i in the current frame; switch_fade_factor represents the switch fade-in/fade-out factor; $DMX\_comp_{i,b}(k)$ represents a compensated downmixed signal of the subband b in the subframe i in the current frame; $RES'_{i,b}(k)$ represents an initial residual signal of the subband b in the subframe i in the current frame; $\overline{RES_{i,b}}(k)$ represents a to-be-encoded residual signal of the subband b in the subframe i in the current frame; the subband b in the subframe i in the current frame is a subband in the at least one subband corresponding to the preset frequency band; k represents a frequency bin index of the subband b in the subframe i in the current frame; and $0 \le i \le P-1$, where P represents a quantity of subframes included in the current frame.

In an embodiment, $Th1 \le b \le Th2$, $Th1 < b \le Th2$, $Th1 \le b < Th2$, or $Th1 < b < Th2$, where Th1 represents an index value of a subband with a smallest index value in the subband corresponding to the preset frequency band, Th2 represents an index value of a subband with a largest index value in the subband corresponding to the preset frequency band, and $0 \leq Th1 < Th2 \leq M-1$, where M represents a quantity of subbands corresponding to the preset frequency band, and $M \geq 2$.

In an embodiment, the determining module is specifically configured to:

determine, based on a residual coding switching flag value of the first target frame, whether the first target frame is a switching frame.

In an embodiment, when a residual coding flag value of the first target frame is unequal to a residual coding flag value of a previous frame of the first target frame, the residual coding switching flag value of the first target frame indicates that the first target frame is a switching frame;

when a residual coding flag value of the first target frame is unequal to a residual coding flag value of a previous frame of the first target frame, and a modification flag value of the residual coding flag of the previous frame of the first target frame indicates that the residual coding flag value of the previous frame of the first target frame has not been modified, the residual coding switching flag value of the first target frame indicates that the first target frame is a switching frame; or when a residual coding flag value of the first target frame is unequal to a residual coding flag value of a previous frame of the first target frame, and a residual coding switching flag of the previous frame of the first target frame indicates that the previous frame of the first target frame is not a switching frame, the residual coding switching flag value of the first target frame indicates that the first target frame is a switching frame; where the residual coding flag value of the first target frame is used to indicate whether a residual signal of the first target frame needs to be encoded, and the residual coding flag value of the previous frame of the first target frame is used to indicate whether a residual signal of the previous frame of the first target frame needs to be encoded.

In an embodiment, the determining module is specifically configured to:

when a residual coding flag value of the first target frame is unequal to a residual coding flag value of a previous frame of the first target frame, determine that the first target frame is a switching frame, where the residual coding flag value of the first target frame is used to indicate whether a residual signal of the first target frame needs to be encoded, and the residual coding flag value of the previous frame of the first target frame is used to indicate whether a residual signal of the previous frame of the first target frame needs to be encoded.

According to a third aspect, this application provides an apparatus for calculating a downmixed signal and a residual signal. The apparatus includes a processor and a memory. The processor is configured to execute a program in the memory. When the processor executes the program, the method according to any one of the first aspect or the possible implementations of the first aspect is implemented.

According to a fourth aspect, this application provides a computer-readable storage medium. The computer-readable storage medium stores program code executed by an apparatus for calculating a downmixed signal and a residual signal. The program code includes an instruction used to perform the method according to any one of the first aspect or the possible implementations of the first aspect.

According to a fifth aspect, this application provides a computer program product including an instruction. When the computer program product is run on an apparatus for calculating a downmixed signal and a residual signal, the apparatus is enabled to perform the method according to any one of the first aspect or the possible implementations of the first aspect.

According to a sixth aspect, a chip is provided. The chip includes a processor and a communications interface. The communications interface is configured to communicate with an external component, and the processor is configured to perform the method according to any one of the first aspect or the possible implementations of the first aspect.

In an embodiment, the chip may further include a memory. The memory stores an instruction, and the processor is configured to execute the instruction stored in the memory. When executing the instruction, the processor is configured to perform the method according to any one of the first aspect or the possible implementations of the first aspect.

In an embodiment, the chip is integrated into a terminal device or a network device.

According to the method and the apparatus for calculating a downmixed signal and a residual signal provided in this application, when the current frame or the previous frame of the current frame is a switching frame, the downmixed signal and the residual signal of the subband corresponding to the preset frequency band in the current frame are recalculated based on an energy relationship between the downmixed signal and the residual signal of the current frame or the previous frame and based on the energy or amplitude relationship between the current frame of signal or the previous frame of signal and the signals of the M frames previous to the current frame or the previous frame. In this way, transition between the switching frame and the previous frame is enabled to be smoother when an encoded and decoded stereo signal is played back, and better auditory quality of the encoded and decoded stereo signal is provided.

DESCRIPTION OF EMBODIMENTS

The following describes the technical solutions of this application with reference to the accompanying drawings.

It should be understood that a stereo signal in this application may be an original stereo signal, may be a stereo signal constituted by two channels of signals included in a multichannel signal, or may be a stereo signal constituted by two channels of signals generated based on at least three channels of signals included in a multichannel signal.

A stereo encoding method in this application may be a stereo encoding method that can be independently applied, or may be a stereo encoding method applied to multichannel signal encoding.

Figure 1:
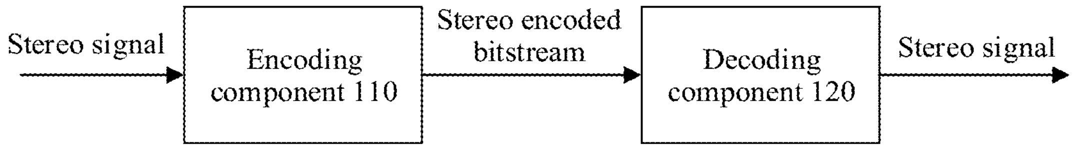
FIG. 1 is a schematic structural diagram of a stereo encoding and decoding system in time domain.

FIG. 1 is a schematic structural diagram of a stereo encoding and decoding system according to an example embodiment of this application. The stereo encoding and decoding system includes an encoding component 110 and a decoding component 120.

The encoding component 110 is configured to encode a stereo signal in frequency domain. Optionally, the encoding component 110 may be implemented by using software, may be implemented by using hardware, or may be implemented by using a combination of software and hardware. This is not limited in this embodiment of this application.

Figure 2:
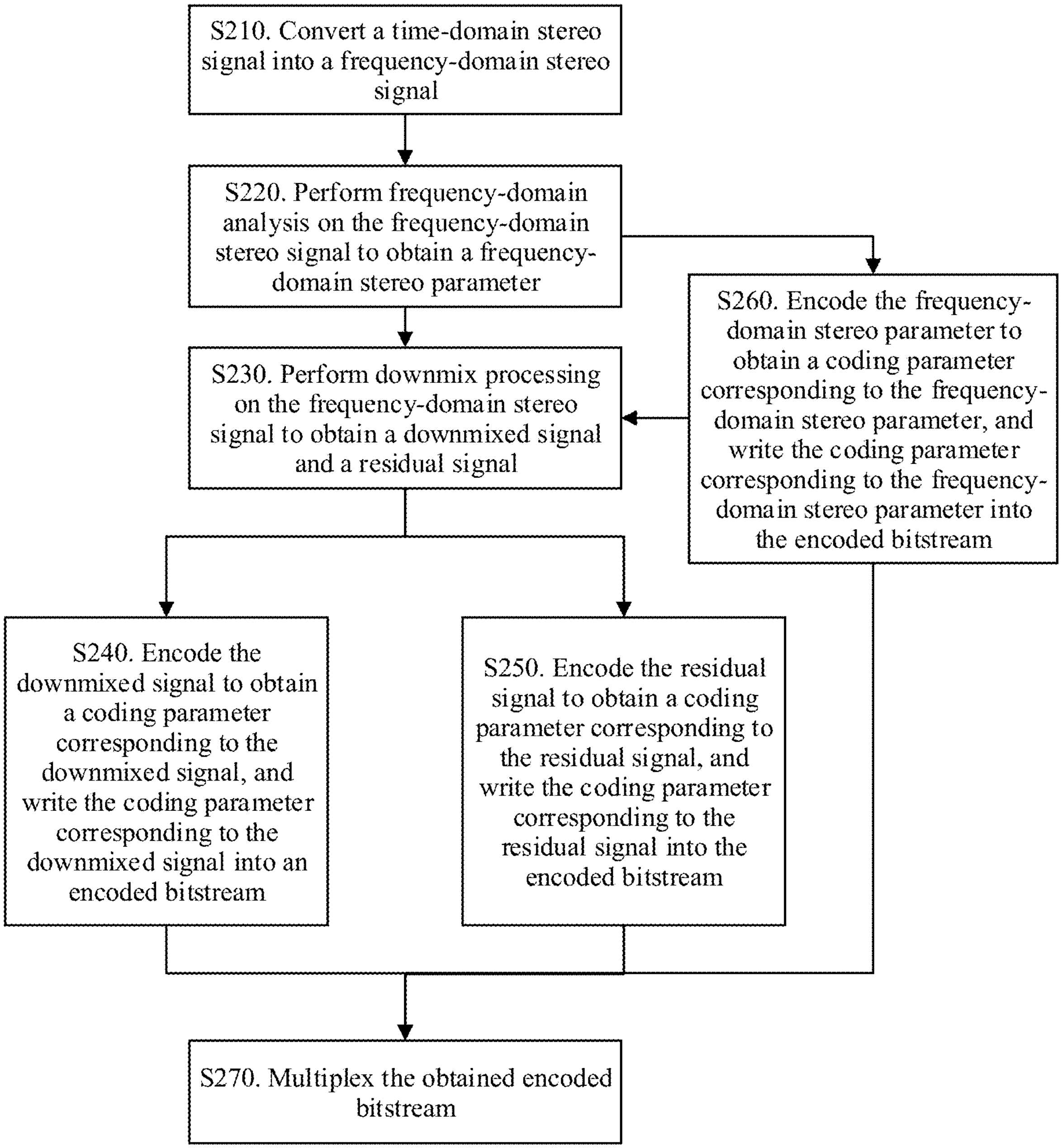
FIG. 2 is a schematic flowchart of a stereo encoding method.

When the encoding component 110 encodes the stereo signal in frequency domain, in a possible embodiment, operations shown in FIG. 2 may be included.

S210. Convert a time-domain stereo signal into a frequency-domain stereo signal.

S220. Perform frequency-domain analysis on the frequency-domain stereo signal to obtain a frequency-domain stereo parameter.

S230. Perform downmix processing on the frequency-domain stereo signal to obtain a downmixed signal and a residual signal.

The downmixed signal may be referred to as a mid channel signal or a primary channel signal, and the residual signal may be referred to as a side channel signal or a secondary channel signal.

S240. Encode the downmixed signal to obtain a coding parameter corresponding to the downmixed signal, and write the coding parameter corresponding to the downmixed signal into an encoded bitstream.

S250. Encode the residual signal to obtain a coding parameter corresponding to the residual signal, and write the coding parameter corresponding to the residual signal into the encoded bitstream. It should be noted that, in some coding modes, S250 is not a mandatory operation, that is, the residual signal is not necessarily encoded.

S260. Encode the frequency-domain stereo parameter to obtain a coding parameter corresponding to the frequency-domain stereo parameter, and write the coding parameter corresponding to the frequency-domain stereo parameter into the encoded bitstream.

S270. Multiplex the obtained encoded bitstream.

Figure 3:
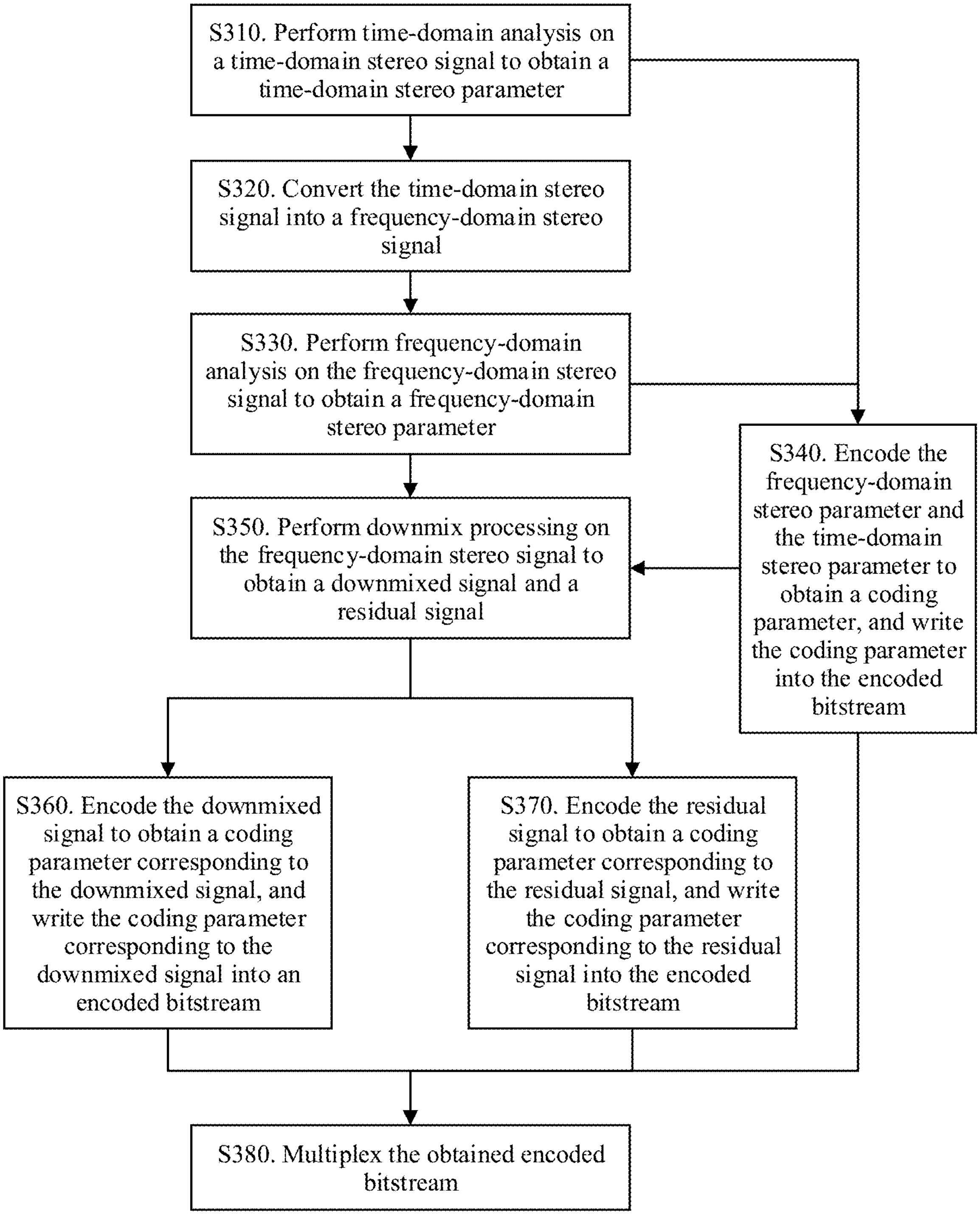
FIG. 3 is a schematic flowchart of another stereo encoding method.

When the encoding component 110 encodes the stereo signal in frequency domain, in another possible embodiment, operations shown in FIG. 3 may be included.

S310. Perform time-domain analysis on a time-domain stereo signal to obtain a time-domain stereo parameter.

S320. Convert the time-domain stereo signal into a frequency-domain stereo signal.

S330. Perform frequency-domain analysis on the frequency-domain stereo signal to obtain a frequency-domain stereo parameter.

S340. Encode the frequency-domain stereo parameter and the time-domain stereo parameter to obtain corresponding coding parameters, and write the coding parameters into an encoded bitstream.

S350. Perform downmix processing on the frequency-domain stereo signal to obtain a downmixed signal and a residual signal.

S360. Encode the downmixed signal to obtain a coding parameter corresponding to the downmixed signal, and write the coding parameter corresponding to the downmixed signal into the encoded bitstream.

S370. Encode the residual signal to obtain a coding parameter corresponding to the residual signal, and write the coding parameter corresponding to the residual signal into the encoded bitstream. It should be noted that, in some coding modes, S370 is not a mandatory operation, that is, the residual signal is not necessarily encoded.

S380. Multiplex the obtained encoded bitstream.

The decoding component 120 is configured to decode the stereo encoded bitstream generated by the encoding component 110, to obtain the stereo signal.

In an embodiment, the encoding component 110 and the decoding component 120 may be wiredly or wirelessly connected to each other. The decoding component 120 may obtain, over this connection between the decoding component 120 and the encoding component 110, the stereo encoded bitstream generated by the encoding component 110. Alternatively, the encoding component 110 may store the generated stereo encoded bitstream in a memory, and the decoding component 120 reads the stereo encoded bitstream from the memory.

In an embodiment, the decoding component 120 may be implemented by using software, may be implemented by using hardware, or may be implemented by using a combination of software and hardware. This is not limited in this embodiment of this application.

A process in which the decoding component 120 decodes the stereo encoded bitstream to obtain the stereo signal may include the following several operations:

(1) Decode a first monophonic encoded bitstream and a second monophonic encoded bitstream in the stereo encoded bitstream to obtain a downmixed signal and a residual signal.

(2) Obtain, based on the stereo encoded bitstream, a coding index of a stereo parameter used for upmix processing, and perform upmix processing on the downmixed signal and the residual signal to obtain an upmix-processed left channel signal and an upmix-processed right channel signal.

(3) Adjust the upmix-processed left channel signal and the upmix-processed right channel signal to obtain the stereo signal.

In an embodiment, the encoding component 110 and the decoding component 120 may be disposed in one device, or may be disposed in different devices. The device may be a terminal having an audio signal processing function, such as a mobile phone, a tablet computer, a laptop portable computer, a desktop computer, a Bluetooth speaker, a recording pen, or a wearable device. Alternatively, the device may be a network element having an audio signal processing capability in a core network or a wireless network. This is not limited in this embodiment.

Figure 4:
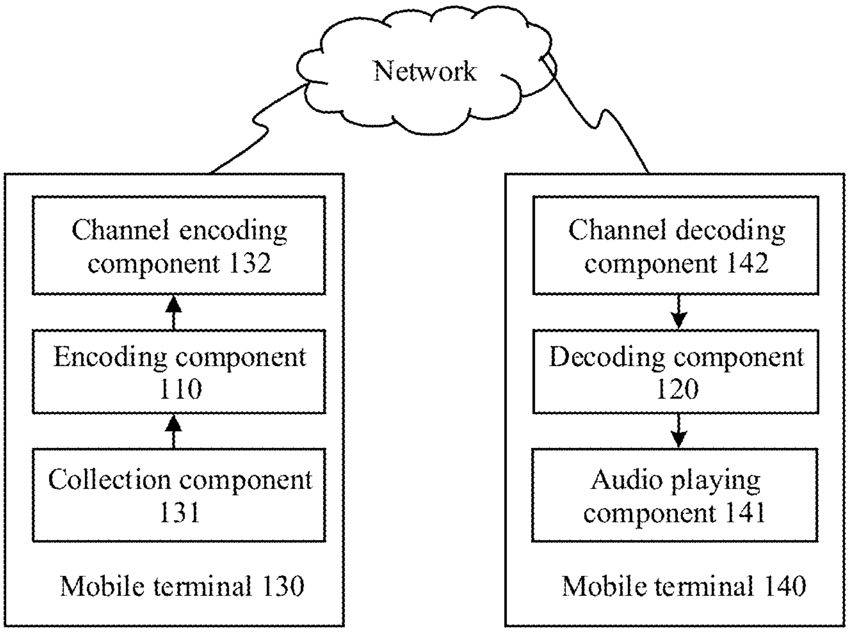
FIG. 4 is a schematic diagram of a mobile terminal according to an embodiment of this application.

For example, as shown in FIG. 4, the following example is used for description in this embodiment. The encoding component 110 is disposed in a mobile terminal 130, and the decoding component 120 is disposed in a mobile terminal 140. The mobile terminal 130 and the mobile terminal 140 are mutually independent electronic devices having an audio signal processing capability. For example, the mobile terminal 130 and the mobile terminal 140 may be mobile phones, wearable devices, virtual reality (virtual reality, VR) devices, augmented reality (augmented reality, AR) devices, or the like. In addition, the mobile terminal 130 and the mobile terminal 140 are connected by using a wireless or wired network.

In an embodiment, the mobile terminal 130 may include a collection component 131, the encoding component 110, and a channel encoding component 132. The collection component 131 is connected to the encoding component 110, and the encoding component 110 is connected to the channel encoding component 132.

In an embodiment, the mobile terminal 140 may include an audio playing component 141, the decoding component 120, and a channel decoding component 142. The audio playing component 141 is connected to the decoding component 120, and the decoding component 120 is connected to the channel decoding component 142.

After collecting a stereo signal by using the collection component 131, the mobile terminal 130 encodes the stereo signal by using the encoding component 110, to obtain a stereo encoded bitstream; and then, encodes the stereo encoded bitstream by using the channel encoding component 132, to obtain a transmission signal.

The mobile terminal 130 sends the transmission signal to the mobile terminal 140 by using the wireless or wired network.

After receiving the transmission signal, the mobile terminal 140 decodes the transmission signal by using the channel decoding component 142, to obtain the stereo encoded bitstream; decodes the stereo encoded bitstream by using the decoding component 120, to obtain the stereo signal; and plays the stereo signal by using the audio playing component. It may be understood that the mobile terminal 130 may alternatively include the components included in the mobile terminal 140, and the mobile terminal 140 may alternatively include the components included in the mobile terminal 130.

Figure 5:
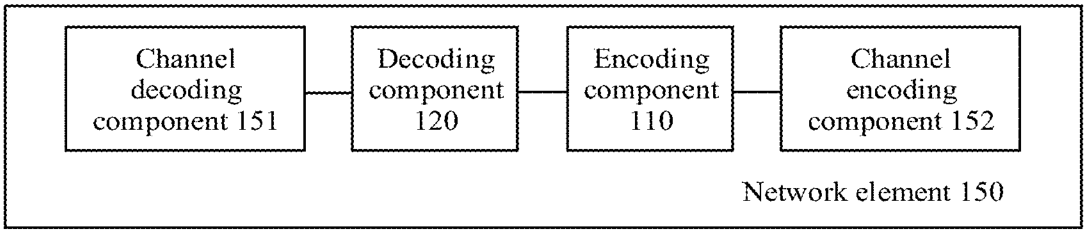
FIG. 5 is a schematic diagram of a network element according to an embodiment of this application.

For example, as shown in FIG. 5, the following example is used for description. The encoding component 110 and the decoding component 120 are disposed in one network element 150 having an audio signal processing capability in a core network or wireless network.

In an embodiment, the network element 150 includes a channel decoding component 151, the decoding component 120, the encoding component 110, and a channel encoding component 152. The channel decoding component 151 is connected to the decoding component 120, the decoding component 120 is connected to the encoding component 110, and the encoding component 110 is connected to the channel encoding component 152.

After receiving a transmission signal sent by another device, the channel decoding component 151 decodes the transmission signal to obtain a first stereo encoded bitstream. The decoding component 120 decodes the stereo encoded bitstream to obtain a stereo signal. The encoding component 110 encodes the stereo signal to obtain a second stereo encoded bitstream. The channel encoding component 152 encodes the second stereo encoded bitstream to obtain a transmission signal.

The another device may be a mobile terminal having an audio signal processing capability, or may be another network element having an audio signal processing capability. This is not limited in this embodiment.

In an embodiment, the encoding component 110 and the decoding component 120 in the network element may transcode a stereo encoded bitstream sent by the mobile terminal.

Optionally, in an embodiment of this application, a device equipped with the encoding component 110 may be referred to as an audio encoding device. In actual implementation, the audio encoding device may also have an audio decoding function. This is not limited in this embodiment of this application.

Optionally, an embodiment of this application is described by using only an example of a stereo signal. In this application, the audio encoding device may alternatively process a multichannel signal, and the multichannel signal includes at least two channels of signals.

This application provides a method for calculating a downmixed signal and a residual signal in a stereo signal encoding process. In the method, when a current frame or a previous frame of the current frame is a switching frame, a downmixed signal and a residual signal of a subband that meets a preset bandwidth range in the current frame are calculated, and the downmixed signal and the residual signal are encoded, to enable transition between a previous frame of the switching frame and the switching frame of a stereo signal that is decoded and played back by a decoder side to be smoother, thereby improving auditory quality of the encoded and decoded stereo signal.

The method for calculating a downmixed signal and a residual signal provided in this application may be applied to S230 or S340.

Figure 6:
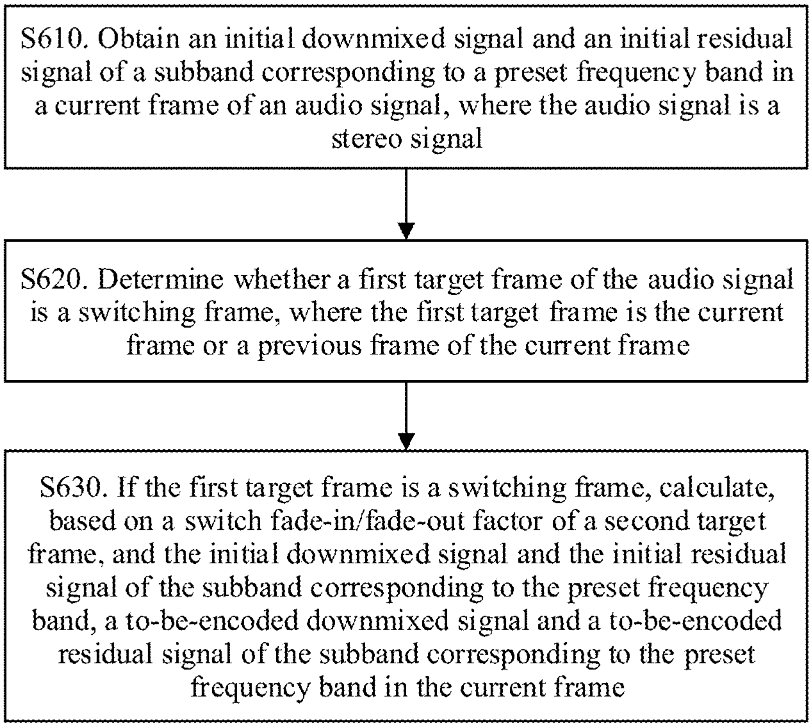
FIG. 6 is a schematic flowchart of a method for calculating a downmixed signal and a residual signal according to an embodiment of this application.

FIG. 6 is a schematic flowchart of a method for calculating a downmixed signal and a residual signal according to an embodiment of this application. The method may be performed by an encoder or performed by a device having a stereo signal encoding function.

S610. Obtain an initial downmixed signal and an initial residual signal of a subband corresponding to a preset frequency band in a current frame of an audio signal, where the audio signal is a stereo signal.

Subbands corresponding to the preset frequency band may be all subbands in the preset frequency band, or may be some subbands in the preset frequency band.

For this operation, refer to the prior art. Details are not described herein.

S620. Determine whether a first target frame of the audio signal is a switching frame, where the first target frame is the current frame or a previous frame of the current frame.

Whether the first target frame is a switching frame may be determined in a plurality of manners. The following provides some possible implementations of determining whether the first target frame is a switching frame.

In an embodiment, whether the first target frame is a switching frame may be determined based on a residual coding switching flag value of the first target frame. For example, when the residual coding switching flag value of the first target frame indicates that the first target frame is a switching frame, the first target frame is a switching frame.

Whether the residual coding switching flag value of the first target frame indicates "the first target frame is a switching frame" or "the first target frame is not a switching frame" may be determined in a plurality of manners.

For example, when a residual coding flag value of the first target frame is unequal to a residual coding flag value of a previous frame of the first target frame, the residual coding switching flag value of the first target frame indicates that the first target frame is a switching frame. When a residual coding flag value of the first target frame is equal to a residual coding flag value of a previous frame of the first target frame, the residual coding switching flag value of the first target frame indicates that the first target frame is not a switching frame.

For ease of description, the residual coding flag value of the first target frame may be referred to as a first residual coding flag value, and the residual coding flag value of the previous frame of the first target frame may be referred to as a second residual coding flag value. The first residual coding flag value is used to indicate whether a residual signal of the first target frame needs to be encoded, and the second residual coding flag value is used to indicate whether a residual signal of the previous frame of the first target frame needs to be encoded.

For another example, when the first residual coding flag value is unequal to the second residual coding flag value, and a modification flag value of a second residual coding flag indicates that the second residual coding flag value has not been modified, the residual coding switching flag value of the first target frame indicates that the first target frame is a switching frame. When the first residual coding flag value is unequal to the second residual coding flag value, and a modification flag value of a second residual coding flag indicates that the second residual coding flag value has been modified, or when the first residual coding flag value is equal to the second residual coding flag value, the residual coding switching flag value of the first target frame indicates that the first target frame is not a switching frame.

After the residual coding switching flag value of the first target frame is determined, a modification flag value of the first residual coding flag may be further updated, so as to facilitate processing for a subsequent frame. The modification flag value of the first residual coding flag of the first target frame has not been modified by default.

For example, when the first residual coding flag value is unequal to the second residual coding flag value, a modification flag value of a second residual coding flag indicates that the second residual coding flag has been modified, and the first residual coding flag indicates that the residual signal of the first target frame does not need to be encoded, the first residual coding flag value is modified, to indicate that the residual signal of the first target frame needs to be encoded, and the modification flag value of the first residual coding flag is set, to indicate that the first residual coding flag value has been modified. When the first residual coding flag value is unequal to the second residual coding flag value, and a modification flag value of a second residual coding flag indicates that the second residual coding flag value has been modified, or when the first residual coding flag value is equal to the second residual coding flag value, the modification flag value of the first residual coding flag value is set, to indicate that the first residual coding flag value has not been modified.

The residual coding flag value of the first target frame may be determined by using a calculated parameter that is of the first target frame and that represents an energy relationship between the downmixed signal and the residual signal.

For example, if the calculated parameter that is of the first target frame and that represents the energy relationship between the downmixed signal and the residual signal is greater than or equal to a preset threshold, the residual coding flag value of the first target frame may be set, to indicate that the residual signal of the first target frame needs to be encoded; otherwise, the residual coding flag value of the first target frame may be set, to indicate that the residual signal of the first target frame does not need to be encoded.

Alternatively, the residual coding flag value of the first target frame may be determined based on the parameter that represents the energy relationship between the downmixed signal and the residual signal and/or based on another parameter For example, in addition to the calculated parameter that is of the first target frame and that represents the energy relationship between the downmixed signal and the residual signal, the residual coding flag value of the first target frame may be alternatively determined based on one or more of parameters such as a voice/music classification result, a voice activation detection result, residual signal energy, and a correlation between a left channel frequency-domain signal and a right channel frequency-domain signal.

For another example, first the first residual coding switching flag value may be set, to indicate that the first target frame is not a switching frame. Then, if the first residual coding flag value is unequal to the second residual coding flag value, and the residual coding switching flag value of the previous frame of the first target frame indicates that the previous frame of the first target frame is not a switching frame, the first residual coding switching flag value is modified, to indicate that the first target frame is a switching frame. Next, if the first residual coding flag value is unequal to the second residual coding flag value, the residual coding switching flag value of the previous frame of the first target frame indicates that the previous frame of the first target frame is not a switching frame, and the first residual coding flag value indicates that the residual signal of the first target frame does not need to be encoded, the first residual coding flag value is modified, to indicate that the residual signal of the first target frame needs to be encoded. Finally, the residual coding switching flag value of the previous frame of the first target frame is updated based on the residual coding switching flag value of the first target frame.

The residual coding flag value of the previous frame of the first target frame may be obtained in a similar manner. Details are not described herein.

In an embodiment, whether the first target frame is a switching frame may be directly determined based on the residual coding flag value of the first target frame and the residual coding flag value of the previous frame of the first target frame.

For example, when the residual coding flag value of the first target frame is unequal to the residual coding flag value of the previous frame of the first target frame, it is determined that the first target frame is a switching frame.

S630. If the first target frame is a switching frame, calculate, based on a switch fade-in/fade-out factor of a second target frame, and the initial downmixed signal and the initial residual signal of the subband corresponding to the preset frequency band, a to-be-encoded downmixed signal and a to-be-encoded residual signal of the subband corresponding to the preset frequency band in the current frame, where the second target frame is the current frame or the previous frame of the first target frame, and the switch fade-in/fade-out factor of the second target frame is determined based on a residual signal coding parameter of the second target frame and at least one of an inter-frame energy fluctuation parameter or an inter-frame amplitude fluctuation parameter of the second target frame; and the residual signal coding parameter of the second target frame is used to represent an energy relationship between a downmixed signal and a residual signal of the second target frame, and the inter-frame energy fluctuation parameter or the inter-frame amplitude fluctuation parameter of the second target frame is used to represent an energy or amplitude relationship between a signal of the second target frame and signals of M frames previous to the second target frame, where M is a positive integer.

The residual signal coding parameter of the second target frame may be specifically used to represent an energy ratio of the downmixed signal of the second target frame to the residual signal of the second target frame;

the residual signal coding parameter of the second target frame may be specifically used to represent an energy difference between the downmixed signal of the second target frame and the residual signal of the second target frame; or the residual signal coding parameter of the second target frame may be specifically used to represent a logarithmic energy difference between the downmixed signal of the second target frame and the residual signal of the second target frame.

An inter-frame energy or amplitude fluctuation parameter of the second target frame may be one of the inter-frame energy fluctuation parameter of the second target frame or the inter-frame amplitude fluctuation parameter of the second target frame.

The inter-frame energy fluctuation parameter of the second target frame may be used to represent a ratio of total energy of the downmixed signal of the second target frame and the residual signal of the second target frame to total energy of a downmixed signal of a previous frame of the second target frame and a residual signal of the previous frame of the second target frame, or the inter-frame energy fluctuation parameter of the second target frame may be used to represent a difference between total energy of the downmixed signal of the second target frame and the residual signal of the second target frame and total energy of a downmixed signal of a previous frame of the second target frame and a residual signal of the previous frame of the second target frame.

In an embodiment, the inter-frame energy fluctuation parameter of the second target frame may be used to represent a difference between a logarithm of total energy of the downmixed signal of the second target frame and the residual signal of the second target frame and a logarithm of total energy of a downmixed signal of a previous frame of the second target frame and a residual signal of the previous frame of the second target frame.

In an embodiment, the inter-frame energy fluctuation parameter of the second target frame may be used to represent a ratio of energy of the downmixed signal of the second target frame to energy of a downmixed signal of a previous frame of the second target frame, or the inter-frame energy fluctuation parameter of the second target frame may be used to represent a difference between energy of the downmixed signal of the second target frame and energy of a downmixed signal of a previous frame of the second target frame.

In an embodiment, the inter-frame energy fluctuation parameter of the second target frame may be used to represent a difference between a logarithm of energy of the downmixed signal of the second target frame and a logarithm of energy of a downmixed signal of a previous frame of the second target frame.

In an embodiment, the inter-frame energy fluctuation parameter of the second target frame may be used to represent a ratio of energy of the residual signal of the second target frame to energy of a residual signal of a previous frame of the second target frame, or the inter-frame energy fluctuation parameter of the second target frame may be used to represent a difference between energy of the residual signal of the second target frame and energy of a residual signal of a previous frame of the second target frame.

In an embodiment, the inter-frame energy fluctuation parameter of the second target frame is used to represent a difference between a logarithm of energy of the residual signal of the second target frame and a logarithm of energy of a residual signal of a previous frame of the second target frame.

The inter-frame amplitude fluctuation parameter of the second target frame may be used to represent a ratio of a sum of an amplitude sum of the downmixed signal of the second target frame and an amplitude sum of the residual signal of the second target frame to a sum of an amplitude sum of the downmixed signal of the previous frame of the second target frame and an amplitude sum of the residual signal of the previous frame of the second target frame, or the inter-frame amplitude fluctuation parameter of the second target frame may be used to represent a difference between a sum of an amplitude sum of the downmixed signal of the second target frame and an amplitude sum of the residual signal of the second target frame and a sum of an amplitude sum of the downmixed signal of the previous frame of the second target frame and an amplitude sum of the residual signal of the previous frame of the second target frame.

In an embodiment, the inter-frame amplitude fluctuation parameter of the second target frame may be used to represent a difference between a logarithm of a sum of an amplitude sum of the downmixed signal of the second target frame and an amplitude sum of the residual signal of the second target frame and a logarithm of a sum of an amplitude sum of the downmixed signal of the previous frame of the second target frame and an amplitude sum of the residual signal of the previous frame of the second target frame.

In an embodiment, the inter-frame amplitude fluctuation parameter of the second target frame may be used to represent a ratio of an amplitude sum of the downmixed signal of the second target frame to an amplitude sum of the downmixed signal of the previous frame of the second target frame, or the inter-frame amplitude fluctuation parameter of the second target frame may be used to represent a difference between an amplitude sum of the downmixed signal of the second target frame and an amplitude sum of the downmixed signal of the previous frame of the second target frame.

In an embodiment, the inter-frame amplitude fluctuation parameter of the second target frame may be used to represent a difference between a logarithm of an amplitude sum of the downmixed signal of the second target frame and a logarithm of an amplitude sum of the downmixed signal of the previous frame of the second target frame.

In an embodiment, the inter-frame amplitude fluctuation parameter of the second target frame may be used to represent a ratio of an amplitude sum of the residual signal of the second target frame to an amplitude sum of the residual signal of the previous frame of the second target frame, or the inter-frame amplitude fluctuation parameter of the second target frame may be used to represent a difference between an amplitude sum of the residual signal of the second target frame and an amplitude sum of the residual signal of the previous frame of the second target frame.

In an embodiment, the inter-frame amplitude fluctuation parameter of the second target frame may be used to represent a difference between a logarithm of an amplitude sum of the residual signal of the second target frame and a logarithm of an amplitude sum of the residual signal of the previous frame of the second target frame.

In a method in an embodiment of this application, the switch fade-in/fade-out factor of the second target frame may be determined in a plurality of manners based on the residual signal coding parameter of the second target frame and at least one of the inter-frame energy fluctuation parameter or the inter-frame amplitude fluctuation parameter of the second target frame.

For example, the switch fade-in/fade-out factor of the second target frame may be determined based on the residual signal coding parameter of the second target frame and the inter-frame energy fluctuation parameter of the second target frame. Alternatively, the switch fade-in/fade-out factor of the second target frame may be determined based on the residual signal coding parameter of the second target frame and the inter-frame amplitude fluctuation parameter of the second target frame. Alternatively, the switch fade-in/fade-out factor of the second target frame may be determined based on the residual signal coding parameter of the second target frame, the inter-frame energy fluctuation parameter of the second target frame, and the inter-frame amplitude fluctuation parameter of the second target frame.

In an embodiment, the switch fade-in/fade-out factor of the second target frame meets the following formula:

when frame_nrg_ratio>NRG_TH1 and res_dmx_ratio<RATIO_TH1, switch_fade_factor=FACTOR_1;

when frame_nrg_ratio<NRG_TH2 and res_dmx_ratio>RATIO_TH2, switch_fade_factor=FACTOR_2; or in another case, switch_fade_factor=FACTOR_3, where frame_nrg_ratio represents the inter-frame energy fluctuation parameter or the inter-frame amplitude fluctuation parameter of the second target frame; res_dmx_ratio represents the residual signal coding parameter of the second target frame; NRG_TH1 represents a preset first threshold of the inter-frame energy fluctuation parameter or the inter-frame amplitude fluctuation parameter; NRG_TH2 represents a preset second threshold of the inter-frame energy fluctuation parameter or the inter-frame amplitude fluctuation parameter; RATIO_TH1 represents a preset first threshold of the residual signal coding parameter; RATIO_TH2 represents a preset second threshold of the residual signal coding parameter; switch_fade_factor represents the switch fade-in/fade-out factor of the second target frame; FACTOR_1 FACTOR_2, and FACTOR_3 represent preset values; and NRG_TH1>NRG_TH2, RATIO_TH1<RATIO_TH2, and FACTOR_1>FACTOR_3>FACTOR_2.

In other words, the switch fade-in/fade-out factor of the second target frame may be determined according to the foregoing formula.

In an embodiment, the switch fade-in/fade-out factor of the second target frame meets the following formula:

when frame_nrg_ratio>NRG_TH1 and res_dmx_ratio<RATIO_TH1, $$\text{switch\_fade\_factor} = \left(1 - \frac{1}{\text{frame\_nrg\_ratio}}\right) * (1 - \text{rem\_dmx\_ratio}) * \text{FADE\_FACTOR\_1};$$

when frame_nrg_ratio<NRG_TH2 and res_dmx_ratio>RATIO_TH2, switch_fade_factor=(1−frame_nrg_ratio)*rem_dmx_ratio*FADE_FACTOR_2; or in another case, switch_fade_factor=FADE_FACTOR_3; where frame_nrg_ratio represents the inter-frame energy fluctuation parameter or the inter-frame amplitude fluctuation parameter of the second target frame; NRG_TH1 represents a preset first threshold of the inter-frame energy fluctuation parameter or the inter-frame amplitude fluctuation parameter; NRG_TH2 represents a preset second threshold of the inter-frame energy fluctuation parameter or the inter-frame amplitude fluctuation parameter; res_dmx_ratio represents the residual signal coding parameter of the second target frame; RATIO_TH1 represents a preset first threshold of the residual signal coding parameter; RATIO_TH2 represents a preset second threshold of the residual signal coding parameter; switch_fade_factor represents the switch fade-in/fade-out factor of the second target frame; FADE_FACTOR_1, FADE_FACTOR_2, and FADE_FACTOR_3 represent preset values; and NRG_TH1>NRG_TH2, RATIO_TH1<RATIO_TH2, and FADE_FACTOR_1>FADE_FACTOR_3>FADE_FACTOR_2.

In other words, the switch fade-in/fade-out factor of the second target frame may be determined according to the foregoing formula.

In an embodiment, an example value of FADE_FACTOR_3 is 0.5.

For another example, a value of FADE_FACTOR_1 may be 0.65, 0.7, 0.75, or 0.8; a value of FADE_FACTOR_2 may be 0.15, 0.20, 0.25, 0.30, or 0.35; and a value of FADE_FACTOR_3 may be 0.45 or 0.55.

In an embodiment, a value of NRG_TH1 may be 3.2, 2.7, 3.0, 3.1, 3.3, 3.4, 3.7, or the like; a value of NRG_TH2 may be 0.21, 0.16, 0.19, 0.20, 0.22, 0.23, 0.26, or the like; a value of RATIO_TH1 may be 0.10, 0.05, 0.08, 0.09, 0.11, 0.12, 0.15, or the like; and a value of RATIO_TH2 may be 0.40, 0.30, 0.35, 0.45, 0.50, or the like.

In an embodiment of this application, when the residual signal coding parameter of the second target frame is used to represent the energy ratio of the downmixed signal of the second target frame to the residual signal of the second target frame, the residual signal coding parameter of the second target frame may be determined based on energy of an initial downmixed signal of the second target frame, energy of an initial residual signal of the second target frame, and a subband side gain of the second target frame.

For example, the second target frame may be divided into P subframes, and a frequency-domain signal of each subframe is divided into M subbands. Then, an energy ratio of an initial downmixed signal to an initial residual signal of each of the P subframes may be calculated by using downmixed signals, residual signals, and subband side gains of first res_flag_band_max subbands in each subframe, and the energy ratio may be used as the residual signal coding parameter of the second target frame.

For example, using an example in which a bandwidth or a bitrate is 26 kbps, the second target frame is divided into 2 (P=2) subframes, each subframe is divided into 10 (M=10) subbands, and a subband index starts from 0. An energy ratio of an initial downmixed signal to an initial residual signal of each of the two subframes is calculated based on downmixed signals, residual signals, and subband side gains of first five (res_flag_band_max=5) subbands in each subframe, so as to obtain res_dmx_ratio. An example calculation process is as follows:

$$g(b) = flx(\text{side\_gain1}[b], \text{side\_gain2}[b]),$$

where side_gain1[b] represents a side gain of a subband b in the first subframe; side_gain2[b] represents a side gain of a subband b in the second subframe; flx(•) represents a function relation expression, indicating that side_gain1 [b] and side_gain2[b] are used as input parameters to obtain g(b) by using any direct proportional relationship; and b is an integer less than 5.

An example calculation manner for g(b) is as follows:

$$g(b) = 0.5 * \text{side\_gain1}[b] + 0.5 * \text{side\_gain2}[b].$$

An energy ratio tmp[b] of the initial downmixed signal to the initial residual signal of the subband b is as follows:

$$tmp[b] = f2x(g(b), \text{res\_cod\_NRG\_M}[b], \text{res\_cod\_NRG\_S}[b]),$$

where res_cod_NRG_M[b] represents energy of the downmixed signal of the subband b; res_cod_NRG_S[b] represents energy of the residual signal of the subband b; f2x(•) represents a function expression, indicating that res_cod_NRG_M[b], g(b), and res_cod_NRG_S[b] are used as input parameters to obtain tmp[b].

An example calculation manner for tmp[b] is as follows $$tmp[b] = \frac{\text{res\_cod\_NRG\_M}[b]}{\text{res\_cod\_NRG\_M}[b] + (1 - g(b)) * (1 - g(b)) * \text{res\_cod\_NRG\_S}[b]}.$$

A residual signal coding parameter res_dmx_ratio of each subframe meets the following formula:

$$\text{res\_dmx\_ratio} = \text{MAX}(tem[0], temp[1], \ldots, tmp[\text{res\_flag\_band\_max} - 1]),$$

where

MAX(•) represents taking a maximum value.

In an embodiment of this application, when the inter-frame energy fluctuation parameter of the second target frame is used to represent the ratio of the total energy of the downmixed signal of the second target frame and the residual signal of the second target frame to the total energy of the downmixed signal of the previous frame of the second target frame and the residual signal of the previous frame of the second target frame, the inter-frame energy fluctuation parameter of the second target frame may be calculated according to the following formula:

$$\text{frame\_nrg\_ratio} = \frac{\text{dmx\_res\_all}}{\text{dmx\_res\_all\_prev}},$$

where frame_nrg_ratio represents the inter-frame energy fluctuation parameter of the second target frame, dmx_res_all represents the total energy of the downmixed signal of the second target frame and the residual signal of the second target frame, and dmx_res_all_prev represents the total energy of the downmixed signal and the residual signal of the previous frame of the second target frame.

In an embodiment, frame_nrg_ratio may be calculated according to the following formula:

$$\text{frame\_nrg\_ratio} = \text{MIN}\left(5.0, \text{MAX}\left(0.2, \frac{\text{dmx\_res\_all}}{\text{dmx\_res\_all\_prev}}\right)\right),$$

where

MIN(•) represents taking a minimum value.

In an embodiment of this application, an example calculation process for the total energy dmx_res_all of the downmixed signal and the residual signal of the second target frame is as follows.

Total energy dmx_nrg_all_curr of downmixed signals of first five (res_flag_band_max=5) subbands in the second target frame is as follows:

$$\text{dmx\_nrg\_all\_curr} = \sum_{b=0}^{b=4} (\gamma_1 * \text{res\_cod\_NRG\_M}[b] + (1 - \gamma_1) * \text{res\_cod\_NRG\_M\_prev}[b]),$$

where res_cod_NRG_M_prev[b]) represents energy of a downmixed signal of a subband b in the previous frame of the second target frame, and $\gamma_1$ represents a smooth factor, where $\gamma_1$ may be generally 0, 1, or a real number between 0 and 1. For example, $\gamma_1$ may be 0.1.

Total energy res_nrg_all_curr of residual signals of the first five subbands in the second target frame is as follows:

$$\text{res\_nrg\_all\_curr} = \sum_{b=0}^{b=4} (\gamma_2 * \text{res\_cod\_NRG\_S}[b] + (1 - \gamma_2) * \text{res\_cod\_NRG\_S\_prev}[b]),$$

where res_cod_NRG_S_prev[b]) represents energy of a residual signal of the subband b in the previous frame of the second target frame, and $\gamma_2$ represents a smooth factor, where $\gamma_2$ may be generally 0, 1, or a real number between 0 and 1. For example, $\gamma_2$ may be 0.1.

Total energy dmx_res_all of the downmixed signals and the residual signals of the first five subbands of the second target frame is as follows:

$$dmx\_res\_all = res\_nrg\_all\_curr + dmx\_nrg\_all\_curr,$$

where dmx_res_all may be used as the total energy of the downmixed signal and the residual signal of the second target frame.

It should be understood that the five subbands in the foregoing example are merely an example, and a process of calculating total energy of downmixed signals and residual signals of another quantity of subbands is similar.

For a manner of calculating the total energy of the downmixed signal and the residual signal of the previous frame of the second target frame, refer to the manner of calculating the total energy of the downmixed signal and the residual signal of the second target frame. Details are not described herein again.

In an embodiment of this application, a possible calculation manner of calculating, based on the switch fade-in/fade-out factor of the second target frame, the to-be-encoded downmixed signal and the to-be-encoded residual signal of the subband corresponding to the preset frequency band in the current frame is as follows:

The to-be-encoded downmixed signal is calculated according to formula $\overline{DMX_{i,b}}(k)=DMX_{i,b}(k)+(1-switch\_fade\_factor)*DMX\_comp_{i,b}(k)$, and the to-be-encoded residual signal is calculated according to formula $\overline{RES_{i,b}}(k)=switch\_fade\_factor*RES'_{i,b}(k)$; where $\overline{DMX_{i,b}}(k)$ represents a to-be-encoded downmixed signal of a subband b in a subframe i in the current frame; $DMX_{i,b}(k)$ represents an initial downmixed signal of the subband b in the subframe i in the current frame; switch_fade_factor represents the switch fade-in/fade-out factor; $DMX\_comp_{i,b}(k)$ represents a compensated downmixed signal of the subband b in the subframe i in the current frame; $RES'_{i,b}(k)$ represents an initial residual signal of the subband b in the subframe i in the current frame; $\overline{RES_{i,b}}(k)$ represents a to-be-encoded residual signal of the subband b in the subframe i in the current frame; the subband b in the subframe i in the current frame is a subband in the at least one subband corresponding to the preset frequency band; k represents a frequency bin index of the subband b in the subframe i in the current frame; and $0 \le i \le P-1$, where P represents a quantity of subframes included in the current frame.

When the to-be-encoded downmixed signal and the to-be-encoded residual signal of the subband corresponding to the preset frequency band in the current frame are calculated based on the switch fade-in/fade-out factor of the second target frame, the subband b in the preset frequency band may meet that b is greater than or equal to Th1 and b is less than or equal to Th2. Th1 represents an index value of a subband with a smallest index value in the subband corresponding to the preset frequency band. Th2 represents an index value of a subband with a largest index value in the subband corresponding to the preset frequency band. $0 \le Th1 < Th2 \le M-1$, where M represents a quantity of subbands corresponding to the preset frequency band, and $M \ge 2$. Optionally, $Th1 \le b \le Th2$, $Th1 < b \le Th2$, $Th1 \le b < Th2$, or $Th1 < b < Th2$.

In other words, when the to-be-encoded mixed signal and the to-be-encoded residual signal of the subband corresponding to the preset frequency band in the current frame are calculated, all or some subbands corresponding to the preset frequency band may be used.

For example, $Th1 \le b \le Th2$ indicates that all the subbands corresponding to the preset frequency band are used to calculate the to-be-encoded downmixed signal and the to-be-encoded residual signal.

For example, $Th1 < b < Th2$ indicates that some subbands corresponding to the preset frequency band are used to calculate the to-be-encoded downmixed signal and the to-be-encoded residual signal.

A range of the subband corresponding to the preset frequency band may be consistent or inconsistent with a range of a subband that corresponds to a frequency band and that is used when the residual signal coding parameter of the second target frame is calculated or when the inter-frame energy fluctuation parameter or the inter-frame amplitude fluctuation parameter of the second target frame is calculated.

For example, in this embodiment of this application, the range of the subband that corresponds to the frequency band and that is used when the residual signal coding parameter of the second target frame is calculated or when the inter-frame energy fluctuation parameter or the inter-frame amplitude fluctuation parameter of the second target frame is calculated includes first res_flag_band_max subbands, and the range of the subband corresponding to the preset frequency band also includes the first res_flag_band_max subbands.

For another example, the range of the subband that corresponds to the frequency band and that is used when the residual signal coding parameter of the second target frame is calculated or when the inter-frame energy fluctuation parameter or the inter-frame amplitude fluctuation parameter of the second target frame is calculated includes first res_flag_band_max subbands, but the range of the subband corresponding to the preset frequency band is $0 < b < res\_flag\_band\_max$.

In an embodiment, switch_fade_factor in $\overline{DMX_{i,b}}(k)=DMX_{i,b}(k)+(1-switch\_fade\_factor)*DMX\_comp_{i,b}(k)$ and $\overline{RES_{i,b}}(k)=switch\_fade\_factor*RES'_{i,b}(k)$ may be preset to 0.5.

If the first target frame is not a switching frame, in some possible implementations, the initial downmixed signal and the initial residual signal of the subband corresponding to the preset frequency band in the current frame may be calculated by using a prior-art method, and the initial downmixed signal and the initial residual signal are respectively used as the to-be-encoded downmixed signal and the to-be-encoded residual signal of the subband corresponding to the preset frequency band in the current frame.

The method for calculating a downmixed signal and a residual signal shown in FIG. 6 may be applied to a stereo encoding process. The following describes, with reference to FIG. 7A and FIG. 7B to FIG. 11A and FIG. 11B, example embodiments of the method for calculating a downmixed signal and a residual signal shown in FIG. 6 in the stereo encoding process.

Figure 7A:
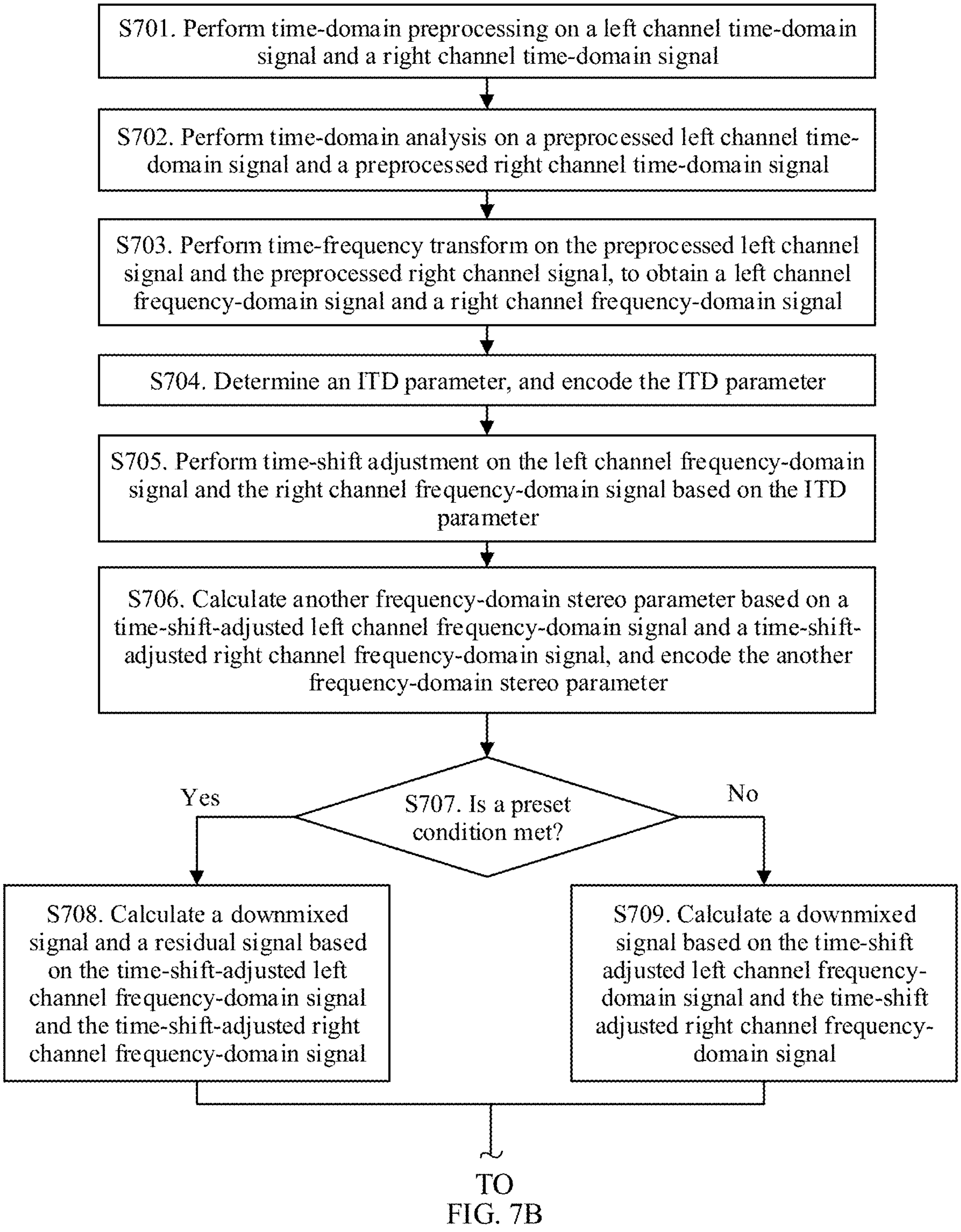
FIG. 7A and FIG. 7B are a schematic flowchart of a stereo signal encoding method according to an embodiment of this application.
Figure 7B:
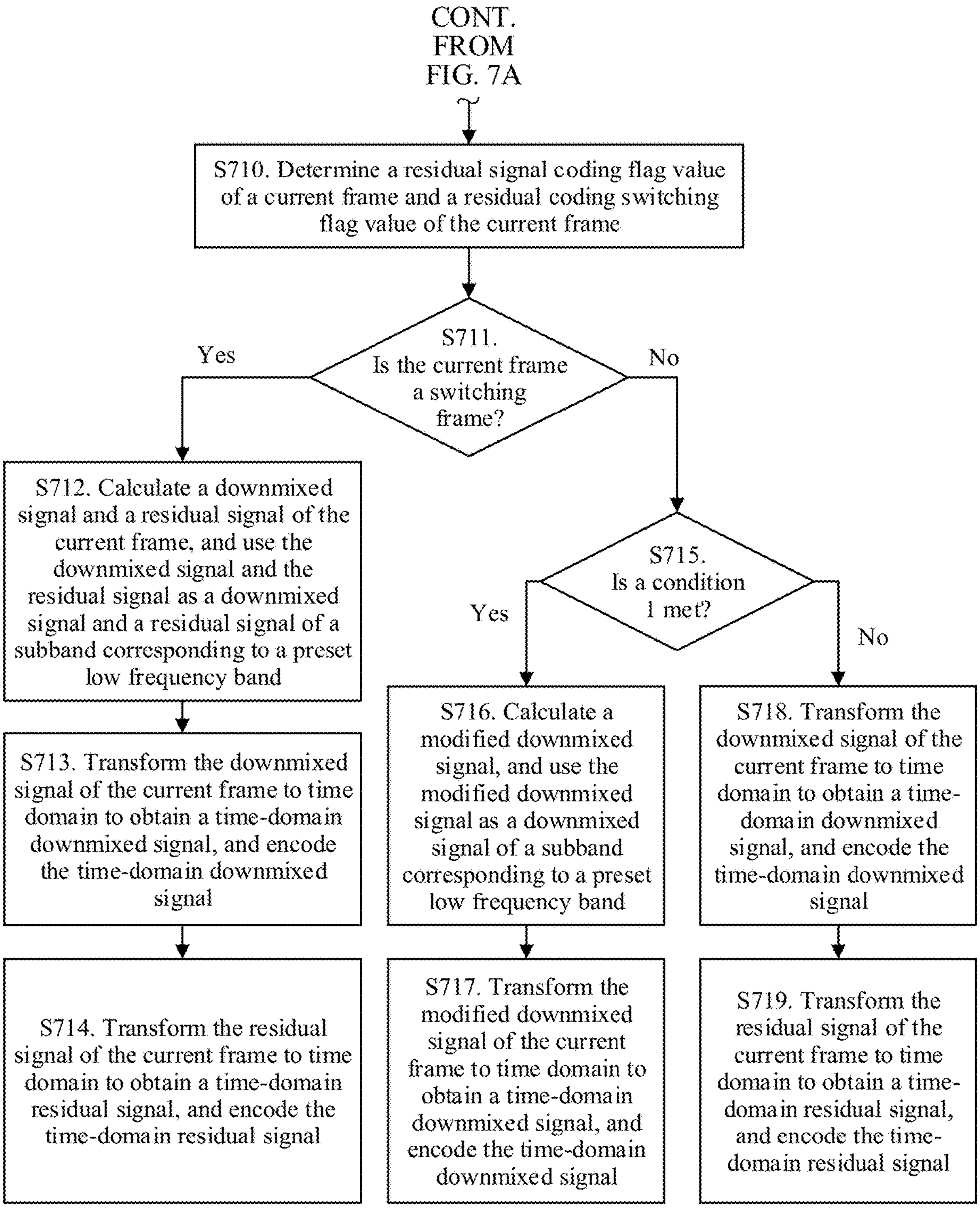

FIG. 7A and FIG. 7B are a schematic flowchart of a stereo signal encoding method according to an embodiment of this application by using the following example. Both a first target frame and a second target frame are current frames; a residual signal encoding parameter of the second target frame is used to represent an energy ratio of a downmixed signal of the second target frame to a residual signal of the second target frame; and an inter-frame energy fluctuation parameter of the second target frame is used to represent a ratio of total energy of the downmixed signal of the second target frame and the residual signal of the second target frame to total energy of a downmixed signal of a previous frame of the second target frame and a residual signal of the previous frame of the second target frame. The method may be performed by an encoder or performed by a device having a stereo signal encoding function. The method may include S701 to S719.

S701. Perform time-domain preprocessing on a left channel time-domain signal and a right channel time-domain signal.

A stereo signal is generally encoded by frame. If a sampling rate of a stereo audio signal is 16 kHz (KHz), each frame of signal is 20 milliseconds (ms), and a frame length is denoted as N, N=320, that is, the frame length includes 320 sampling points.

A stereo signal of the current frame includes a left channel time-domain signal of the current frame and a right channel time-domain signal of the current frame. The left channel time-domain signal of the current frame is denoted as $x_L(n)$, and the right channel time-domain signal of the current frame is denoted as $x_R(n)$ where n represents a sampling point number, and n=0, 1, . . . , N−1.

Performing time-domain preprocessing on the left channel time-domain signal and the right channel time-domain signal of the current frame may include: performing high-pass filtering processing on both the left channel time-domain signal and the right channel time-domain signal of the current frame to obtain a preprocessed left channel time-domain signal of the current frame and a preprocessed right channel time-domain signal of the current frame. The preprocessed left channel time-domain signal of the current frame is denoted as $x_{L\_HP}(n)$, and the preprocessed right channel time-domain signal of the current frame is denoted as $x_{R\_HP}(n)$, where n represents a sampling point number, and n=0, 1, . . . , N−1. An infinite impulse response (Infinite Impulse Response, IIR) filter with a cut-off frequency of 20 Hz (Hz) may be used or a filter of another type may be used for high-pass filtering processing.

For example, when a sampling rate of the stereo signal is 16 KHz, a corresponding transfer function of the high-pass filter with a cut-off frequency of 20 Hz may be as follows:

$$H_{20\ Hz}(z) = \frac{b_0 + b_1 z^{-1} + b_2 z^{-2}}{1 + a_1 z^{-1} + a_2 z^{-2}},$$

where $b_0$=0.994461788958195, $b_1$=−1.988923577916390, $b_2$=0.994461788958195, $a_1$=1.988892905899653, $a_2$=−0.988954249933127, and z represents a Z transform factor. Correspondingly, the preprocessed left channel time-domain signal is as follows:

$$X_{L\_HP}(n) = b_0 * x_L(n) + b_1 * x_L(n-1) + b_2 * x_L(n-2) - a_1 * x_{L\_HP}(n-1) - a_2 * x_{L\_HP}(n-2).$$

S702. Perform time-domain analysis on the preprocessed left channel signal and the preprocessed right channel signal.

For example, the time-domain analysis may include transient detection. The transient detection means that energy detection may be performed on both the preprocessed left channel time-domain signal of the current frame and the preprocessed right channel time-domain signal of the current frame, to detect whether an energy burst occurs in the current frame.

For example, energy $E_{cur\_L}$ of the preprocessed left channel time-domain signal of the current frame is calculated. Transient detection is performed based on an absolute value of a difference between energy $E_{pre\_L}$ of a preprocessed left channel time-domain signal of a previous frame and the energy $E_{cur\_L}$ of the preprocessed left channel time-domain signal of the current frame, to obtain a transient detection result of the preprocessed left channel time-domain signal of the current frame. Transient detection may be performed on the preprocessed right channel time-domain signal of the current frame by using the same method.

The time-domain analysis may include other time-domain analysis in the prior art in addition to the transient detection. For example, the time-domain analysis may include time-domain inter-channel time difference (Inter-channel Time Difference, ITD) parameter determining, time-domain delay alignment processing, and band spreading preprocessing.

S703. Perform time-frequency transform on the preprocessed left channel signal and the preprocessed right channel signal, to obtain a left channel frequency-domain signal and a right channel frequency-domain signal.

For example, discrete Fourier transform may be performed on the preprocessed left channel signal to obtain the left channel frequency-domain signal, and discrete Fourier transform may be performed on the preprocessed right channel signal to obtain the right channel frequency-domain signal.

To overcome a problem of spectral aliasing, an overlap-add method may be used for processing between two consecutive times of discrete Fourier transform, and sometimes, zero may be added to an input signal of discrete Fourier transform.

Discrete Fourier transform may be performed once for each frame. Alternatively, each frame of signal may be divided into P subframes, and discrete Fourier transform is performed once for each subframe.

If discrete Fourier transform is performed once for each frame, a transformed left channel frequency-domain signal may be denoted as L(k), where k=0, 1, . . . , a/2−1; and a transformed right channel frequency-domain signal may be denoted as R(k), where k=0, 1, . . . , a/2−1, k represents a frequency bin index value, and a represents a length of each frame for which discrete Fourier transform is performed once.

If discrete Fourier transform is performed once for each subframe, a transformed left channel frequency-domain signal of a subframe i may be denoted as $L_i(k)$, where k=0, 1, . . . , L/2−1; and a transformed right channel frequency-domain signal of the subframe i may be denoted as $R_i(k)$, where k=0, 1, . . . , L/2−1, k represents a frequency bin index value, represents a subframe index value, i=0, 1, . . . , P−1, and L represents a length of each subframe for which discrete Fourier transform is performed once.

For example, a sampling rate is 16000 Hz, and a coding bandwidth is 8000 Hz. Each frame of left channel signal or each frame of right channel signal is 20 ms, and a frame length is denoted as N, N=320, that is, the frame length includes 320 sampling points. Each frame of signal is divided into two subframes, that is, P=2. Each subframe of signal is 10 ms, and a subframe length includes 160 sampling points.

Discrete Fourier transform is performed once for each subframe, and a length of each subframe for which discrete Fourier transform is performed is denoted as a, where a=400, that is, the length of each subframe for which discrete Fourier transform is performed includes 400 sampling points. In this case, the transformed left channel frequency-domain signal of the subframe i may be denoted as $L_i(k)$, where k=0, 1, . . . , L/2−1; and the transformed right channel frequency-domain signal of the subframe i may be denoted as $R_i(k)$, where k=−0, 1, . . . , L/2−1, k represents the frequency bin index value, i represents the subframe index value, i=0, 1, . . . , P−1, and L represents the length of each subframe for which discrete Fourier transform is performed once.

In an embodiment, time-frequency transform technologies such as fast Fourier transform (FFT) and modified discrete cosine transform (MDCT) may be alternatively used to transform a time-domain signal into a frequency-domain signal. This is not specifically limited in this embodiment of this application.

S704. Determine an ITD parameter, and encode the ITD parameter.

There are a plurality of methods for determining the ITD parameter. The ITD parameter may be determined only in frequency domain, may be determined only in time domain, or may be determined in time-frequency domain. This is not limited in this application.

If the ITD is determined in time domain, an ITD between the left channel time-domain signal and the right channel time-domain signal may be determined.

For example, in a range of $0 \le i \le T_{max}$, $$c_n(i) = \sum_{j=0}^{N-1-i} x_{R\_HP}(j) \cdot x_{L\_HP}(j+i) \text{ and}$$

$$c_p(i) = \sum_{j=0}^{N-1-i} x_{L\_HP}(j) \cdot x_{R\_HP}(j+i)$$

are calculated. If $$\max_{0 \le i \le Tmax}(c_n(i)) > \max_{0 \le i \le Tmax}(c_p(i)),$$

an ITD parameter value is an opposite number of an index value corresponding to MAX(Cn(i)); otherwise, an ITD parameter value is an index value corresponding to MAX (Cp(i)), where i represents an index value for calculating a cross-correlation coefficient, j represents an index value of a sampling point, $T_{max}$ corresponds to a maximum value of ITD values at different sampling rates, and N represents a frame length. Different values of MAX(Cp(i)) may correspond to different values, and the values corresponding to MAX(Cp(i)) are index values corresponding to MAX(Cn (i)).

If the ITD is determined in frequency domain, an ITD between the left channel frequency-domain signal and the right channel frequency-domain signal may be determined.

For example, in this embodiment of this application, a DFT-transformed left channel frequency-domain signal of the subframe i is denoted as $L_i(k)$ where k=0, 1, . . . , L/2−1; and a transformed right channel frequency-domain signal of the subframe i is denoted as, where k=0, 1, . . . , L/2−1 and i=0, 1, . . . , P−1.

A frequency-domain correlation coefficient of the subframe i is calculated according to $XCORR_i(k)=L_i(k)*R_i*(k)$, where $R^*_i(k)$ represents a conjugation of the transformed right channel frequency-domain signal of the subframe i. A frequency-domain cross-correlation coefficient is transformed into time-domain cross-correlation coefficient $xcorr_i(n)$, where n=0, 1, . . . , L−1. A maximum value of $xcorr_i(n)$ is searched for in a range of $L/2-T_{max} \le n \le L/2+T_{max}$ to obtain that an ITD parameter value of the subframe i is $$T_i = \arg \max_{L/2-T_{max} \le n \le L/2+T_{max}} (xcorr_i(n)) - \frac{L}{2}.$$

For another example, an amplitude value may be calculated according to $$mag(j) = \sum_{i=0}^{1} \sum_{k=0}^{L/2-1} L_i(k)^* R_i(k)^* \exp\left(\frac{2\pi * k * j}{L}\right)$$

in a search range of $-T_{max} \le j \le T_{max}$ based on the DFT-transformed left channel frequency-domain signal in the subframe i and the DFT-transformed right channel frequency-domain signal in the subframe i, and the ITD parameter value is $$T = \arg \max_{-T_{max} \le j \le T_{max}} (mag(j)),$$

to be specific, the ITD parameter value is an index value corresponding to a maximum amplitude value.

Certainly, the ITD may be alternatively determined in time-frequency domain. For brevity, details are not described herein.

After the ITD parameter is determined, the ITD parameter may be encoded and written into a stereo encoded bitstream. In this embodiment of this application, any existing quantization encoding technology may be used to encode the ITD parameter. This is not specifically limited in this embodiment of this application.

S705. Perform time-shift adjustment on the left channel frequency-domain signal and the right channel frequency-domain signal based on the ITD parameter.

Time-shift adjustment may be performed on the left channel frequency-domain signal and the right channel frequency-domain signal by using any technology. This is not limited in this embodiment of this application.

For example, each frame of signal is divided into P subframes, where P=2. A time-shift-adjusted left channel frequency-domain signal of a subframe i may be denoted as $L'_i(k)$, where k=0, 1, . . . , L/2−1; and a time-shift-adjusted right channel frequency-domain signal of the subframe i may be denoted as $R'_i(k)$, where k=0, 1, . . . , L/2−1, k represents a frequency bin index value, i=0, 1, . . . , P−1, and $$L'_i(k) = L_i(k) * e^{-j2\pi\frac{T_i}{L}}$$

$$R'_i(k) = R_i(k) * e^{-j2\pi\frac{T_i}{L}},$$

$T_i$ represents an ITD parameter value of the subframe i, L represents a length of the discrete Fourier transform, $L_i(k)$ represents a transformed left channel frequency-domain signal of the subframe i, $R_i(k)$ represents a transformed right channel frequency-domain signal of the subframe i, and i represents a subframe index value, where i=0, 1, . . . , P−1.

If DFT is not performed by frame, time shift adjustment may be alternatively performed once in the entire frame.

S706. Calculate a frequency-domain stereo parameter based on a time-shift-adjusted left channel frequency-domain signal and a time-shift-adjusted right channel frequency-domain signal, and encode the frequency-domain stereo parameter obtained through calculation.

The frequency-domain stereo parameter obtained through calculation may include one or more of an inter-channel phase difference (Inter-channel Phase Difference, IPD) parameter, an inter-channel level difference (Inter-channel Level Difference, ILD) parameter, and a subband side gain. The ILD may also be referred to as an inter-channel amplitude difference.

After the frequency-domain stereo parameter is obtained through calculation, the frequency-domain stereo parameter may be encoded and written into the stereo encoded bitstream. In this embodiment of this application, any existing quantization encoding technology may be used to encode the frequency-domain stereo parameter. This is not specifically limited in this embodiment of this application.

S707. Determine whether a frequency-domain signal of the current frame or each subband index of each of subframes obtained by dividing the current frame meets a preset condition. If the frequency-domain signal of the current frame or each subband index of each of subframes obtained by dividing the current frame meets the preset condition, perform S708; or if the frequency-domain signal of the current frame or each subband index of each of subframes obtained by dividing the current frame does not meet the preset condition, perform S709.

For example, subband division is performed on the frequency-domain signal of the current frame or the frequency-domain signal of each of the subframes obtained by dividing the current frame, and a frequency bin included in a subband b is k∈[band_limits(b), band_limits(b+1)−1] where band_limits(b) represents a minimum index value of the frequency bin included in the subband b. In this embodiment of this application, the frequency-domain signal of each subframe is divided into M subbands, and frequency bin included in each subband may be determined based on band_limits(b).

The preset condition may be that a subband index value is less than a maximum subband index value for residual coding decision, that is, b<res_cod_band_max, where res_cod_band_max represents the maximum subband index value for residual coding decision.

The preset condition may be that a subband index value is less than or equal to a maximum subband index value for residual coding decision, that is, b≤res_cod_band_max.

The preset condition may be that a subband index value is less than a maximum subband index value for residual coding decision and is greater than a minimum subband index value for residual coding decision, that is, res_cod_band_min<b<res_cod_band_max where res_band_max represents the maximum subband index value for residual coding decision, and res_cod_band_min represents the minimum subband index value for residual coding decision.

The preset condition may be that a subband index value is less than or equal to a maximum subband index value for residual coding decision and is greater than or equal to a minimum subband index value for residual coding decision, that is, res_cod_band_min≤b≤res_cod_band_max.

The preset condition may be that a subband index value is less than or equal to a maximum subband index value for residual coding decision and is greater than a minimum subband index value for residual coding decision, that is, res_cod_band_min<b≤res_cod_band_max.

The preset condition may be that a subband index value is less than a maximum subband index value for residual coding decision and is greater than or equal to a minimum subband index value for residual coding decision, that is, res_cod_band_min≤b<res_cod_band_max.

Different preset conditions may be set for different coding rates and/or different coding bandwidths. For example, when a coding bandwidth is wideband, and coding rate is 26 kbps, the preset condition may be that the subband index value b<5. When a coding bandwidth is wideband, and coding rate is 44 kbps, the preset condition may be that the subband index value b<6 When a coding bandwidth is wideband, and coding rate is 56 kbps, the preset condition may be that the subband index value b<7.

In an embodiment of this application, for example, the coding bandwidth is the wideband, and coding rate is 26 kbps. Each frame of signal is divided into P subframes, where P=2; and a frequency-domain signal of each subframe is divided into M subbands, where M=10. In this case, for each frame of signal, whether each subband index meets the preset condition needs to be determined, and the preset condition is the subband index value b<res_flag_band_max, where res_flag_band_max=5.

S708. Calculate an initial downmixed signal and an initial residual signal based on the time-shift-adjusted left channel frequency-domain signal and the time-shift-adjusted right channel frequency-domain signal.

For example, if the subband index value b<res_flag_band_max, and res_flag_band_max=5, the downmixed signal and the residual signal are calculated based on the time-shift-adjusted left channel frequency-domain signal and the time-shift-adjusted right channel frequency-domain signal.

If an initial downmixed signal of the subband b in the subframe i may be denoted as $DMX_{i,b}(k)$, and an initial residual signal of the subband b in the subframe i may be denoted as $RES'_{i,b}(k)$, $DMX_{i,b}(k)$ and $RES'_{i,b}(k)$ meet the following:

$$DMX_{i,b}(k) = \frac{L''_{i,b}(k) + R''_{i,b}(k)}{2}$$

$$RES'_{i,b}(k) = RES_{i,b}(k) - \text{g\_ILD}_i * DMX_{i,b}(k)$$

$$RES_{i,b}(k) = \frac{L''_{i,b}(k) + R''_{i,b}(k)}{2}$$

$$\begin{cases} L''_{i,b}(k) = L'_{i,b}(k) * e^{-j\beta} \\ R''_{i,b}(k) = R'_{i,b}(k) * e^{-j(IPD(b)-\beta)} \end{cases}$$

$$\beta = \arctan(\sin(IPD_i(b)), \cos(IPD_i(b)) + 2^* c)$$

$$c = \frac{l + \text{g\_ILD}_j}{l - \text{g\_gILD}_i},$$

where $IPD_i(b)$ represents the IPD parameter of the subband b in the subframe i; g-$ILD_i$ represents the subband side gain of the subframe i;

$$L'_{i,b}(k)$$

represents the time-shift-adjusted left channel frequency-domain signal of the subband b in the subframe i;

$$R'_{i,b}(k)$$

represents the time-shift-adjusted right channel frequency-domain signal of the subband b in the subframe i;

$$L''_{i,b}(k)$$

represents a left channel frequency-domain signal, obtained after a plurality of stereo parameters are adjusted, of the subband b in the subframe i;

$$R''_{i,b}(k)$$

represents a right channel frequency-domain signal, obtained after stereo parameters (such as the IC, the ILD, the ITD, and the IPD) are adjusted, of the subband b in the subframe i; k represents the frequency bin index value, where k∈[band_limits(b), band_limits(b+1)−1], band_limits(b) represents a minimum index value of a frequency bin included in the subband b; and i represents the subframe index value, where i=0, 1, . . . , P−1.

For another example, the initial downmixed signal of the subband b in the subframe i may be alternatively calculated by using the following method:

$$DMX_{i,b}(k) = \left[L''_{i,b}(k) + R''_{i,b}(k)\right] * c$$

$$c = \sqrt{\frac{1}{2} * \frac{L''_{i,b}(k)^2 + R''_{i,b}(k)^2}{\left(L''_{i,b}(k) + R''_{i,b}(k)\right)^2}},$$

where $$L''_{i,b}(k)$$

represents a left channel frequency-domain signal, obtained after a plurality of stereo parameters are adjusted, of the subband b in the subframe i;

$$R''_{i,b}(k)$$

represents a right channel frequency-domain signal, obtained after the plurality of stereo parameters are adjusted, of the subband b in the subframe i; k represents the frequency bin index value, where k∈[band_limits(b), band_limits(b+1)−1], and band_limits(b) represents the minimum index value of a frequency bin included in the subband b; and Z represents the subframe index value, where i=0, 1, . . . , P−1. A method for calculating the initial downmixed signal and the initial residual signal is not limited in this embodiment of this application.

S709. Calculate the initial downmixed signal based on the time-shift-adjusted left channel frequency-domain signal and the time-shift-adjusted right channel frequency-domain signal.

For example, if the subband index value b≥res_flag_band_max, and res_flag_band_max=5, the initial downmixed signal may be calculated based on the time-shift-adjusted left channel frequency-domain signal and the time-shift-adjusted right channel frequency-domain signal. An initial downmixed signal in a subband that does not meet the preset condition may be calculated in a same manner of calculating the initial downmixed signal in the subband that meets the preset condition, or may be calculated by using another downmixed signal calculation method.

S710. Determine a residual coding flag value of the current frame and a residual coding switching flag value of the current frame.

The residual coding flag value of the current frame and the residual coding switching flag value of the current frame may be determined by using the method in S620.

In an embodiment, when the residual coding switching flag value of the current frame is determined, the switch fade-in/fade-out factor of the current frame may be updated.

The switch fade-in/fade-out factor of the current frame may be determined by using the method in S630.

S711. Determine whether the residual coding switching flag value of the current frame indicates that the current frame is a switching frame. If the residual coding switching flag value of the current frame indicates that the current frame is a switching frame, perform S712, S713, and S714; or if the residual coding switching flag value of the current frame indicates that the current frame is not a switching frame, perform S715.

S712. Calculate a to-be-encoded downmixed signal and a to-be-encoded residual signal of a subband corresponding to a preset frequency band.

It should be understood that S712 of calculating the to-be-encoded residual signal is not a mandatory operation. Generally, when a determining result in S707 is that the preset condition is met, the residual signal may be encoded.

For example, the to-be-encoded downmixed signal and the to-be-encoded residual signal of the subband corresponding to the preset frequency band are calculated based on a switch fade-in/fade-out factor of the current frame.

For example, when a preset low frequency band is a subband with a subband index greater than 0 and less than 5, if the residual coding switching flag value of the current frame is greater than 0, when the subband index is greater than 0 and less than 5, to be specific, when the subband index is 1, 2, 3, or 4, the to-be-encoded downmixed signal and the to-be-encoded residual signal of the subband corresponding to the preset frequency band may be calculated based on the switch fade-in/fade-out factor of the current frame.

For example, a to-be-encoded downmixed signal of the subband b in the subframe i in the current frame meets the following:

$$\overline{DMX_{i,b}}(k) = DMX_{i,b}(k) + (1 - \text{switch\_fade\_factor}) * \text{DMX\_comp}_{i,b}(k),$$

where $\text{DMX\_comp}_{i,b}(k)$ represents a compensated downmixed signal of the subband b in the subframe i; $DMX_{i,b}(k)$ represents the initial downmixed signal of the subband b in the subframe i; $\overline{DMX_{i,b}}(k)$ represents a to-be-encoded downmixed signal of a switching frame of the subband b in the subframe i; k represents the frequency bin index value, where k∈[band_limits(b), band_limits(b+1)−1], and band_limits(b) represents the minimum frequency bin index value of the subband b; and switch_fade_factor represents the switch fade-in/fade-out factor of the current frame.

For example, a to-be-encoded residual signal of the subband b in the subframe i in the current frame-meets the following:

$$\overline{RES_{i,b}}(k) = \text{switch\_fade\_factor} * RES'_{i,b}(k),$$

where $RES'_{i,b}(k)$ represents the initial residual signal of the subband b in the subframe i; $\overline{RES_{i,b}}(k)$ represents a to-be-encoded residual signal of the switching frame of the subband b in the subframe i; k represents the frequency bin index value, where k∈[band_limits(b), band_limits(b+1)−1], and band_limits(b) represents the minimum frequency bin index value of the subband b; and switch_fade_factor represents the switch fade-in/fade-out factor of the current frame.

The preset frequency band may be a preset low frequency band. If a minimum subband index value of the preset low frequency band is denoted as res_cod_band_min and a maximum subband index value of the preset low frequency band is denoted as res_cod_band_max, a subband index b of the preset low frequency band may meet res_cod_band_min<b<res_cod_band_max, or a subband index b of the preset low frequency band may meet res_cod_band_min≤b≤res_cod_band_max, or a subband index b of the preset low frequency band may meet res_cod_band_min<b≤res_cod_band_max, or a subband index b of the preset low frequency band may meet res_cod_band_min≤b<res_cod_band_max.

A range of the preset frequency band may be the same as a subband range that is set when it is determined whether each subband index meets the preset condition, or may be different from a subband range that is set when it is determined whether each subband index meets the preset condition. For example, if the range of the subband range that is set when it is determined whether each subband index meets the preset condition is that b<5, the preset low frequency band may include all subbands with subband indexes less than 5, or may include all subbands with subband indexes greater than 0 and less than 5, or may include all subbands with subband indexes greater than 1 and less than 7.

S713. Transform the initial downmixed signal of the current frame to time domain to obtain a time-domain downmixed signal, and encode the time-domain downmixed signal.

In an embodiment, after the initial downmixed signal of the current frame is transformed to time domain to obtain the time-domain downmixed signal, the time-domain downmixed signal obtained through transform is encoded to obtain an encoded bitstream of the downmixed signal, and the encoded bitstream of the downmixed signal is written into the stereo encoded bitstream.

If frame division processing is performed on the current frame of signal, and band division processing is performed on each subframe obtained through frame division, downmixed signals of all subbands of each subframe need to be combined to constitute a downmixed signal of the subframe i, which is denoted as $DMX_i''(k)$, where k=0, 1, . . . , L/2−1 The downmixed signal of the subframe i is transformed to time domain to obtain the time-domain downmixed signal through inverse discrete Fourier transform, and an overlap-add method may be used for processing between subframes, to obtain the time-domain downmixed signal of the current frame.

S714. Transform the initial residual signal of the current frame to time domain to obtain a time-domain residual signal, and encode the time-domain residual signal.

It should be understood that S714 is not a mandatory operation. Generally, S714 may be performed when the to-be-encoded residual signal is calculated in S712.

In an embodiment, after the residual signal of the current frame is transformed to time domain to obtain the time-domain residual signal, the time-domain residual signal obtained through transform is encoded to obtain an encoded bitstream of the residual signal, and the encoded bitstream of the residual signal is written into the stereo encoded bitstream.

If frame division processing is performed on the current frame of signal, and band division processing is performed on each subframe obtained through frame division, residual signals of all subbands of each subframe need to be combined to constitute a residual signal of the subframe i, which is denoted as $$RES_i''(k),$$

where k=0, 1, . . . , L/2−1. The residual signal of the subframe i is transformed to time domain to obtain the time-domain residual signal through inverse discrete Fourier transform, and an overlap-add method may be used for processing between subframes, to obtain the time-domain residual signal of the current frame.

S715. Determine whether the residual coding flag value of the current frame meets a condition 1. If the residual coding flag value of the current frame meets the condition 1, S716 and S717 are performed; or if the residual coding flag value of the current frame does not meet the condition 1, S718 and S719 are performed.

The condition 1 may include: The residual signal does not need to be encoded. For example, when the residual coding flag value of the current frame indicates that the residual signal does not need to be encoded, the condition 1 is met.

For example, the condition 1 may be a bit value "0", indicating that the residual signal does not need to be encoded. If the residual coding flag value of the current frame is "0", it indicates that the residual coding flag value of the current frame meets the condition 1.

S716. Calculate a modified downmixed signal of the current frame, and determine the modified downmixed signal of the current frame in the preset frequency band as the to-be-encoded downmixed signal of the current frame in the preset frequency band.

The calculating a modified downmixed signal of the current frame may include:

obtaining the initial downmixed signal of the current frame;

obtaining a downmix compensation factor of the current frame; and modifying the initial downmixed signal of the current frame based on the downmix compensation factor of the current frame, to obtain the modified downmixed signal of the current frame.

For the entire stereo encoding, if the initial downmixed signal is not calculated before S716, the initial downmixed signal needs to be calculated first.

For example, the initial downmixed signal of the current frame may be calculated based on the left channel frequency-domain signal of the current frame and the right channel frequency-domain signal of the current frame. Alternatively, an initial downmixed signal of each subband corresponding to the preset frequency band in the current frame may be calculated based on a left channel frequency-domain signal of the subband corresponding to the preset frequency band in the current frame and a right channel frequency-domain signal of the subband corresponding to the preset frequency band in the current frame. Alternatively, an initial downmixed signal of each subframe in the current frame may be calculated based on a left channel frequency-domain signal of the subframe in the current frame and a right channel frequency-domain signal of the subframe in the current frame. Alternatively, an initial downmixed signal of each subband corresponding to the preset frequency band in each subframe in the current frame may be calculated based on a left channel frequency-domain signal of the subband corresponding to the preset frequency band in the subframe in the current frame and a right channel frequency-domain signal of the subband corresponding to the preset frequency band in the subframe in the current frame.

In an embodiment of this application, the initial downmixed signal $DMX_{i,b}(k)$ of the subband b in the subframe i in the range of the preset frequency band has been calculated in S707. Therefore, no calculation is required herein. Certainly, if the range of the preset frequency band does not belong to the subband range that meets the preset condition when it is determined whether each subband index meets the preset condition, an initial downmixed signal that is within the range of the preset frequency band but does not belong to the subband range that meets the preset condition when it is determined whether each subband index meets the preset condition needs to be calculated.

If the downmix compensation factor has not been calculated before operation S716, the downmix compensation factor needs to be calculated first.

When the downmix compensation factor is calculated, the downmix compensation factor of the current frame may be calculated based on the left channel frequency-domain signal of the current frame and the right channel frequency-domain signal of the current frame. Alternatively, a downmix compensation factor of each subband in the current frame may be calculated based on a left channel frequency-domain signal of the subband in the current frame and a right channel frequency-domain signal of the subband in the current frame. Alternatively, a downmix compensation factor of each subband corresponding to the preset low frequency band in the current frame may be calculated based on a left channel frequency-domain signal of the subband corresponding to the preset low frequency band in the current frame and a right channel frequency-domain signal of the subband corresponding to the preset low frequency band in the current frame.

If the current frame of signal is divided into several subframes for processing, a downmix compensation factor of each subframe in the current frame may be calculated based on a left channel frequency-domain signal of the subframe in the current frame and a right channel frequency-domain signal of the subframe in the current frame. Alternatively, a downmix compensation factor of each subband in each subframe in the current frame may be calculated based on a left channel frequency-domain signal of the subband in the subframe in the current frame and a right channel frequency-domain signal of the subband in the subframe in the current frame. Alternatively, a downmix compensation factor of each subband corresponding to the preset low frequency band in each subframe in the current frame may be calculated based on a left channel frequency-domain signal of the subband corresponding to the preset low frequency band in the subframe in the current frame and a right channel frequency-domain signal of the subband corresponding to the preset low frequency band in the subframe in the current frame.

The left channel frequency-domain signal may be an original left channel frequency-domain signal, may be a time-shift-adjusted left channel frequency-domain signal, or may be a left channel frequency-domain signal obtained after a plurality of stereo parameters are adjusted. Similarly, the right channel frequency-domain signal may be an original right channel frequency-domain signal, may be a time-shift-adjusted right channel frequency-domain signal, or may be a right channel frequency-domain signal obtained after a plurality of stereo parameters are adjusted.

For example, the current frame is divided into P subframes, where P=2. Each subframe is divided into M subbands, where M=10 When the preset low frequency band is a subband with a subband index greater than 0 and less than 5, the downmix compensation factor may be calculated within the range of the preset frequency band, and a downmix compensation factor of a subband b in a subframe i in the current frame is calculated based on a left channel frequency-domain signal of the subband b in the subframe i in the current frame and a right channel frequency-domain signal of the subband b in the subframe i in the current frame. The downmix compensation factor of the subband b in the subframe i may be denoted $\alpha_i(b)$, and may meet the following:

$$\alpha_i(b) = \frac{\sqrt{E\_L_i(b)} + \sqrt{E\_R_i(b)} - \sqrt{E\_LR_i(b)}}{2\sqrt{E\_L_i(b)}}$$

$$E\_L_i(b) = \sum_{k=band\_limits(b)}^{k=band\_limits(b+1)-1} L''_{i,b}(k)^2$$

$$E\_R_i(b) = \sum_{k=band\_limits(b)}^{k=band\_limits(b+1)-1} R''_{i,b}(k)^2$$

$$E\_LR_i(b) = \sum_{k=band\_limits(b)}^{k=band\_limits(b+1)-1} \left[L''_{i,b}(k)^2 + R''_{i,b}(k)^2\right],$$

where $E\_L_i(b)$ represents an energy sum of the left channel frequency-domain signal of the subband b in the subframe i; $E\_R_i(b)$ represents an energy sum of the right channel frequency-domain signal of the subband b in the subframe i; $E\_LR_i(b)$ represents an energy sum of the left channel frequency-domain signal and the right channel frequency-domain signal of the subband b in the subframe i; band_limits(b) represents a minimum frequency bin index value of the subband b;

$$L''_{i,b}(k)$$

represents the left channel frequency-domain signal, obtained after stereo parameter adjustment, of the subband b in the subframe i;

$$R''_{i,b}(k)$$

represents a right channel frequency-domain signal, obtained after stereo parameter adjustment, of the subband b in the subframe i. k represents a frequency bin index value; and i represents a subframe index value, where i=0, 1, . . . , P−1.

The stereo parameter adjustment may be adjustment for a plurality of frequency-domain stereo parameters, including time-shift adjustment performed based on the ITD parameter. In addition to the ITD parameter, the plurality of frequency-domain stereo parameters may include at least one of stereo parameters in the prior art such as the IC, the ILD, the IPD, and the subband side gain.

When the initial downmixed signal of the current frame is modified based on the downmix compensation factor of the current frame to obtain the modified downmixed signal of the current frame, the compensated downmixed signal of the current frame may be calculated based on the left channel frequency-domain signal of the current frame or the right channel frequency-domain signal of the current frame, and the downmix compensation factor. The modified downmixed signal of the current frame is calculated based on the initial downmixed signal of the current frame and the compensated downmixed signal of the current frame.

That the compensated downmixed signal of the current frame is calculated based on the left channel frequency-domain signal of the current frame or the right channel frequency-domain signal of the current frame, and the downmix compensation factor may be that a product of the left channel frequency-domain signal of the current frame and the downmix compensation factor is used as the compensated downmixed signal of the current frame, or that a product of the right channel frequency-domain signal of the current frame and the downmix compensation factor is used as the compensated downmixed signal of the current frame.

That the modified downmixed signal of the current frame is calculated based on the initial downmixed signal of the current frame and the compensated downmixed signal of the current frame may be that a sum of the compensated downmixed signal of the current frame and the initial downmixed signal of the current frame is used as the modified downmixed signal of the current frame.

The downmix compensation factor may be calculated by frame, by subband in a frame, or by subband corresponding to a preset frequency band in a frame; or may be calculated by subframe, by subband in a subframe, or by subband corresponding to a preset frequency band in a subframe. Similarly, a process of calculating the compensated downmixed signal and a process of calculating the modified downmixed signal also need to be performed in a same manner.

In this embodiment, a compensated downmixed signal, of the subband b in the subframe i, calculated based on a downmix compensation factor of the subband b in the subframe i and the left channel frequency-domain signal of the subband b in the subframe i meets the following:

$$\mathrm{DMX\_comp}_{i,b}(k) = \alpha_i(b) * L''_{i,b}(k),$$

where $L_{i,b}''(k)$ represents the left channel frequency-domain signal, obtained after stereo parameter adjustment, of the subband b in the subframe i; k represents the frequency bin index value, where k∈[band_limits(b), band_limits(b+1)−1], and band_limits(b) represents the minimum frequency bin index value of the subband b; $\alpha_i(b)$ represents the downmix compensation factor of the subband b in the subframe i, $\mathrm{DMX\_comp}_{i,b}(k)$ represents the compensated downmixed signal of the subband b in the subframe i; and i represents the subframe index value, where A modified downmixed signal, of the subband b in the subframe i, calculated based on the downmixed signal of the subband b in the subframe i and the compensated downmixed signal of the subband b in the subframe i meets the following:

$$\widetilde{DMX}_{i,b}(k) = DMX_{i,b}(k) + \mathrm{DMX\_comp}_{i,b}(k),$$

where $\mathrm{DMX\_comp}_{i,b}(k)$ represents the compensated downmixed signal of the subband b in the subframe i; $\mathrm{DMX}_{i,b}(k)$ represents the initial downmixed signal of the subband b in the subframe i; $\widetilde{DMX}_{i,b}(k)$ represents the modified downmixed signal of the subband b in the subframe i; k represents the frequency bin index value, where k∈[band_limits(b), band_limits(b+1)−1], and band_limits(b) represents the minimum frequency bin index value of the subband b; and i represents the subframe index value, where i=0, 1, . . . , P−1.

S717. Transform the modified downmixed signal of the current frame to time domain to obtain a time-domain downmixed signal, and encode the time-domain downmixed signal. For this operation, refer to S713. Details are not described herein again.

S718. Transform the initial downmixed signal of the current frame to time domain to obtain a time-domain downmixed signal, and encode the time-domain downmixed signal. For this operation, refer to S713. Details are not described herein again.

S719. Transform the initial residual signal of the current frame to time domain to obtain a time-domain residual signal, and encode the time-domain residual signal. For a transform method, refer to S714. Details are not described herein again.

It should be understood that S719 is not a mandatory operation. Generally, S719 is performed when a determining result in S707 is that the preset condition is met.

Figure 8A:
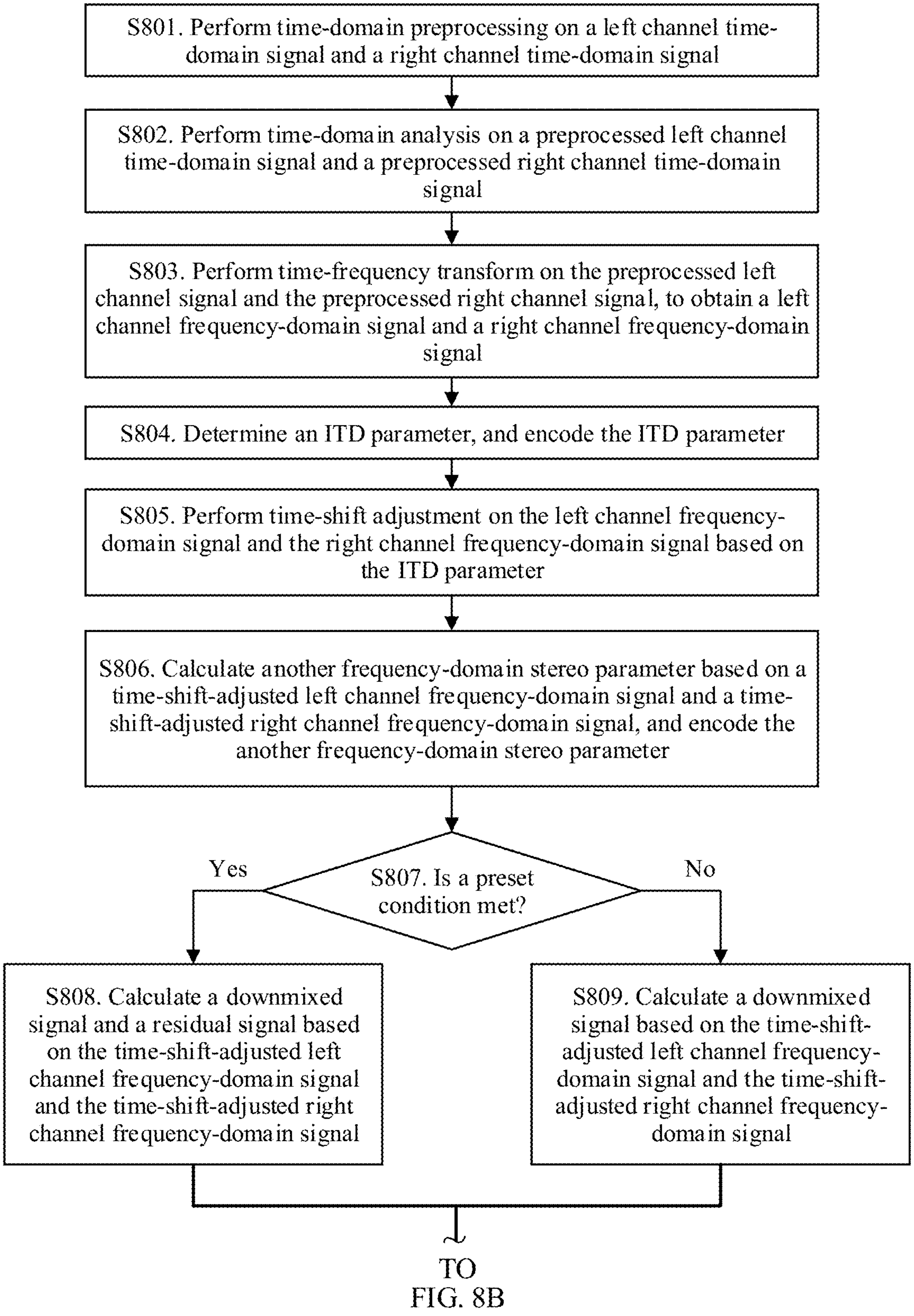
FIG. 8A and FIG. 8B are a schematic flowchart of a stereo signal encoding method according to an embodiment of this application.
Figure 8B:
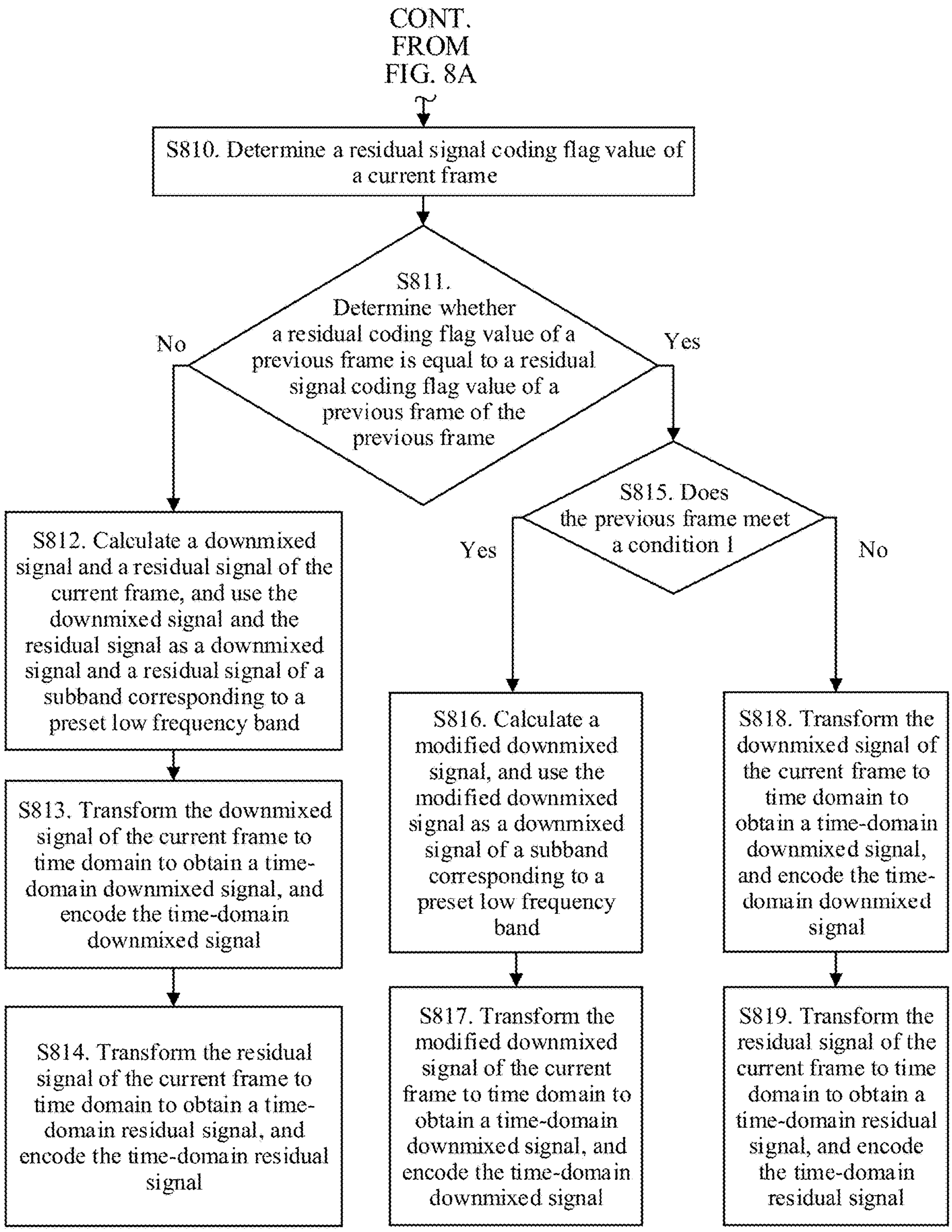

FIG. 8A and FIG. 8B are a schematic flowchart of a stereo signal encoding method according to an embodiment of this application by using the following example. Both a first target frame and a second target frame are previous frames of a current frame; a residual signal coding parameter of the second target frame is used to represent an energy ratio of a downmixed signal of the second target frame to a residual signal of the second target frame; and an inter-frame energy fluctuation parameter of the second target frame is used to represent a ratio of total energy of the downmixed signal of the second target frame and the residual signal of the second target frame to total energy of a downmixed signal of a previous frame of the second target frame and a residual signal of the previous frame of the second target frame. The method may be performed by an encoder or performed by a device having a stereo signal encoding function. The method may include S801 to S819.

For S801 to S809, refer to S701 to S709. Details are not described herein again.

S810. Determine a residual coding flag value of the current frame.

For a method for determining the residual coding flag value of the current frame, refer to the method for determining the residual coding flag value of the current frame in S710. Details are not described herein again.

S811. Determine whether a residual coding flag value of the previous frame of the current frame is equal to a residual coding flag value of a previous frame of the previous frame. If the residual coding flag value of the previous frame of the current frame is equal to the residual coding flag value of the previous frame of the previous frame, S812, S813, and S814 are performed; or if the residual coding flag value of the previous frame of the current frame is unequal to the residual coding flag value of the previous frame of the previous frame, S815 is performed.

The residual coding flag value of the previous frame may be denoted as prev_res_cod_mode_flag. In this embodiment of this application, for example, if prev_res_cod_mode_flag is equal to 1, it may indicate that a residual signal of the previous frame needs to be encoded; or if prev_res_cod_mode_flag is equal to 0, it indicates that a residual signal of the previous frame does not need to be encoded.

The residual coding flag value of the previous frame of the previous frame may be denoted as prev2_res_cod_mode_flag. In this embodiment of this application, for example, when prev2_res_cod_mode_flag is equal to 1, it may indicate that a residual signal of the previous frame of the previous frame needs to be encoded; or if prev2_res_cod_mode_flag is equal to 0, it indicates that a residual signal of the previous frame of the previous frame does not need to be encoded.

For S812 to S814, refer to S712 to S714. Details are not described herein again.

S815. Determine whether the residual coding flag value of the previous frame meets a condition 1. If the residual coding flag value of the previous frame meets the condition 1, S816 and S817 are performed; or if the residual coding flag value of the previous frame does not meet the condition 1, S818 and S819 are performed.

For S816 to S819, refer to S716 to S719. Details are not described herein again.

It should be understood that concepts such as a residual coding switching flag value and a modification flag value of a residual signal coding flag may not be used in the method shown in FIG. 8A and FIG. 8B. Therefore, when reference is made to the operations in FIG. 8, a calculation process related to these concepts may be ignored.

Figure 9A:
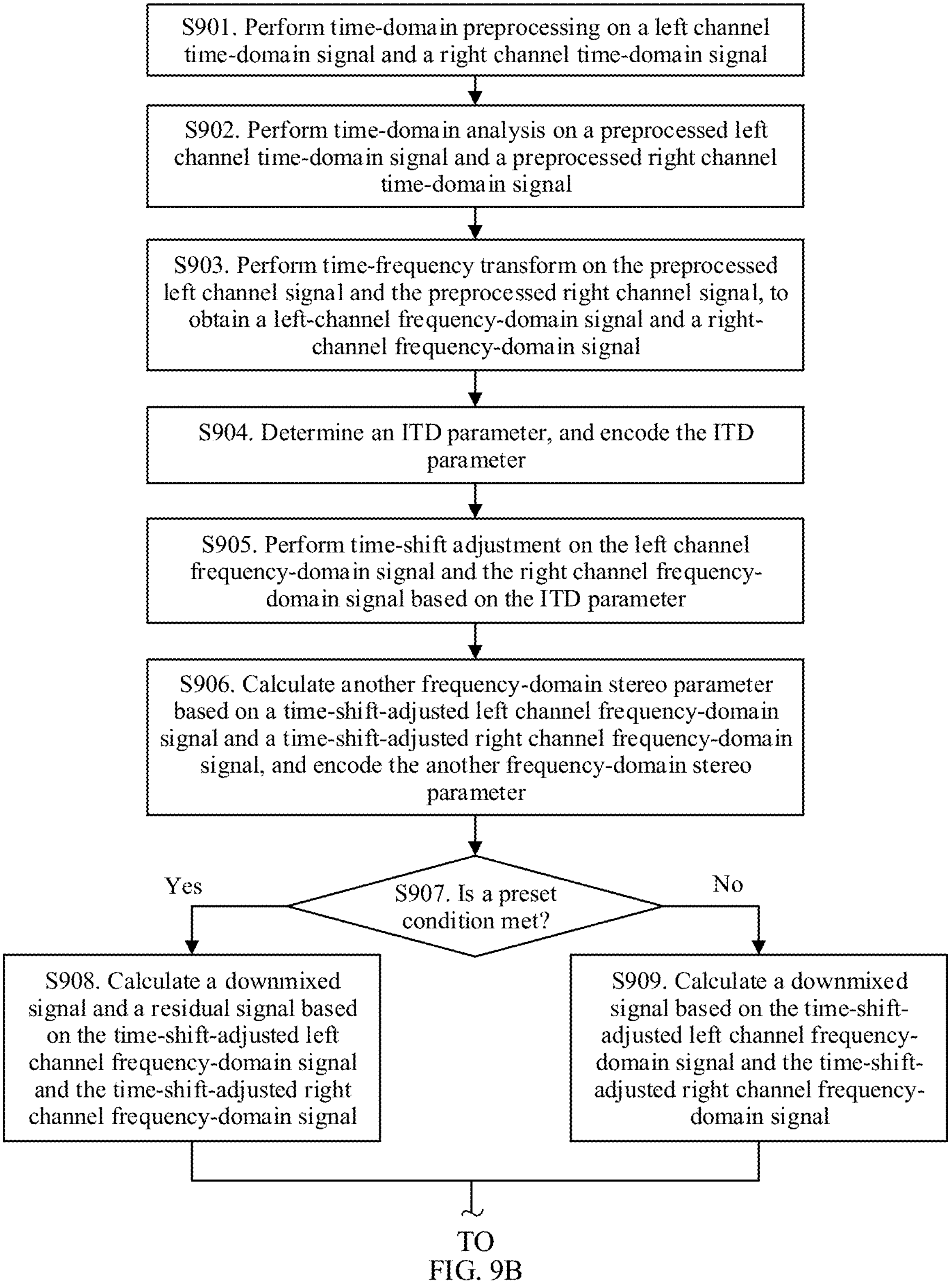
FIG. 9A and FIG. 9B are a schematic flowchart of a stereo signal encoding method according to an embodiment of this application.
Figure 9B:
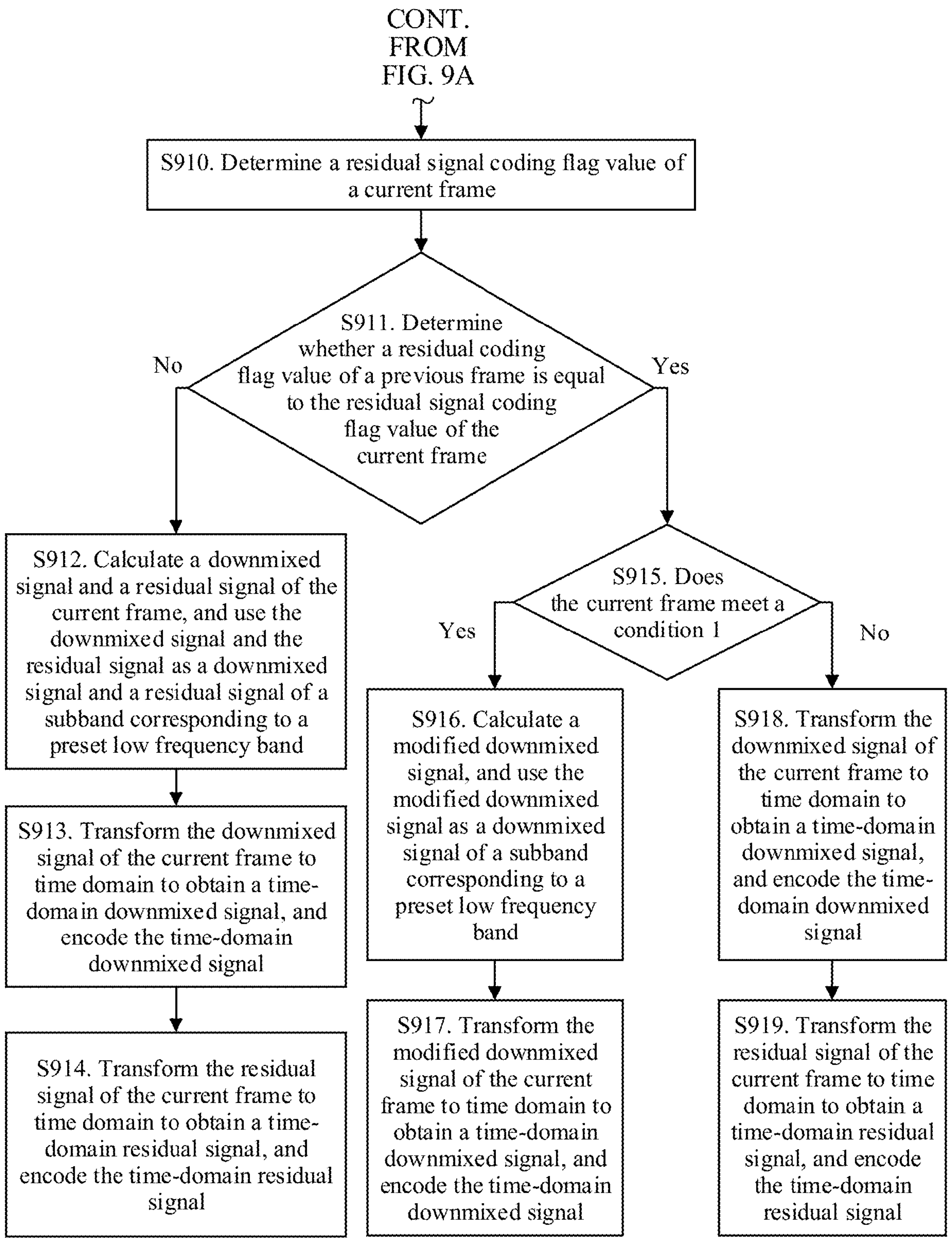

FIG. 9A and FIG. 9B are a schematic flowchart of a stereo signal encoding method according to another embodiment of this application by using the following example. Both a first target frame and a second target frame are current frames; a residual signal coding parameter of the second target frame is used to represent an energy ratio of a downmixed signal of the second target frame to a residual signal of the second target frame; and an inter-frame energy fluctuation parameter of the second target frame is used to represent a ratio of total energy of the downmixed signal of the second target frame and the residual signal of the second target frame to total energy of a downmixed signal of a previous frame of the second target frame and a residual signal of the previous frame of the second target frame. The method may be performed by an encoder or performed by a device having a stereo signal encoding function. The method may include S901 to S919.

For S901 to S910, refer to S801 to S810. Details are not described herein again.

S911. Determine whether a residual coding flag value of the current frame is equal to a residual coding flag value of a previous frame of the current frame. If the residual coding flag value of the current frame is equal to the residual coding flag value of the current frame, S912, S913, and S914 are performed; or if the residual coding flag value of the current frame is unequal to the residual coding flag value of the current frame, S915 is performed.

The residual coding flag value of the previous frame may be denoted as prev_res_cod_mode_flag. In this embodiment of this application, for example, if prev_res_cod_mode_flag is equal to 1, it may indicate that a residual signal of the previous frame needs to be encoded; or if prev_res_cod_mode_flag is equal to 0, it indicates that a residual signal of the previous frame does not need to be encoded.

The residual coding flag value of the current frame may be denoted as res_cod_mode_flag. In this embodiment of this application, for example, if res_cod_mode_flag is equal to 1, it may indicate that a residual signal of the current frame needs to be encoded; or if res_cod_mode_flag is equal to 0, it indicates that a residual signal of the current frame does not need to be encoded.

For S912 to S914, refer to S712 to S714. Details are not described herein again.

S915. Determine whether the residual coding flag value of the current frame meets a condition 1. If the residual coding flag value of the current frame meets the condition 1, S916 and S917 are performed; or if the residual coding flag value of the current frame does not meet the condition 1, S918 and S919 are performed.

For S916 to S919, refer to S716 to S719. Details are not described herein again.

It should be understood that concepts such as a residual coding switching flag value and a modification flag value of a residual signal coding flag may not be used in the method shown in FIG. 9A and FIG. 9B. Therefore, when reference is made to the operations in FIG. 7A and FIG. 7B, a calculation process related to these concepts may be ignored.

Figure 10A:
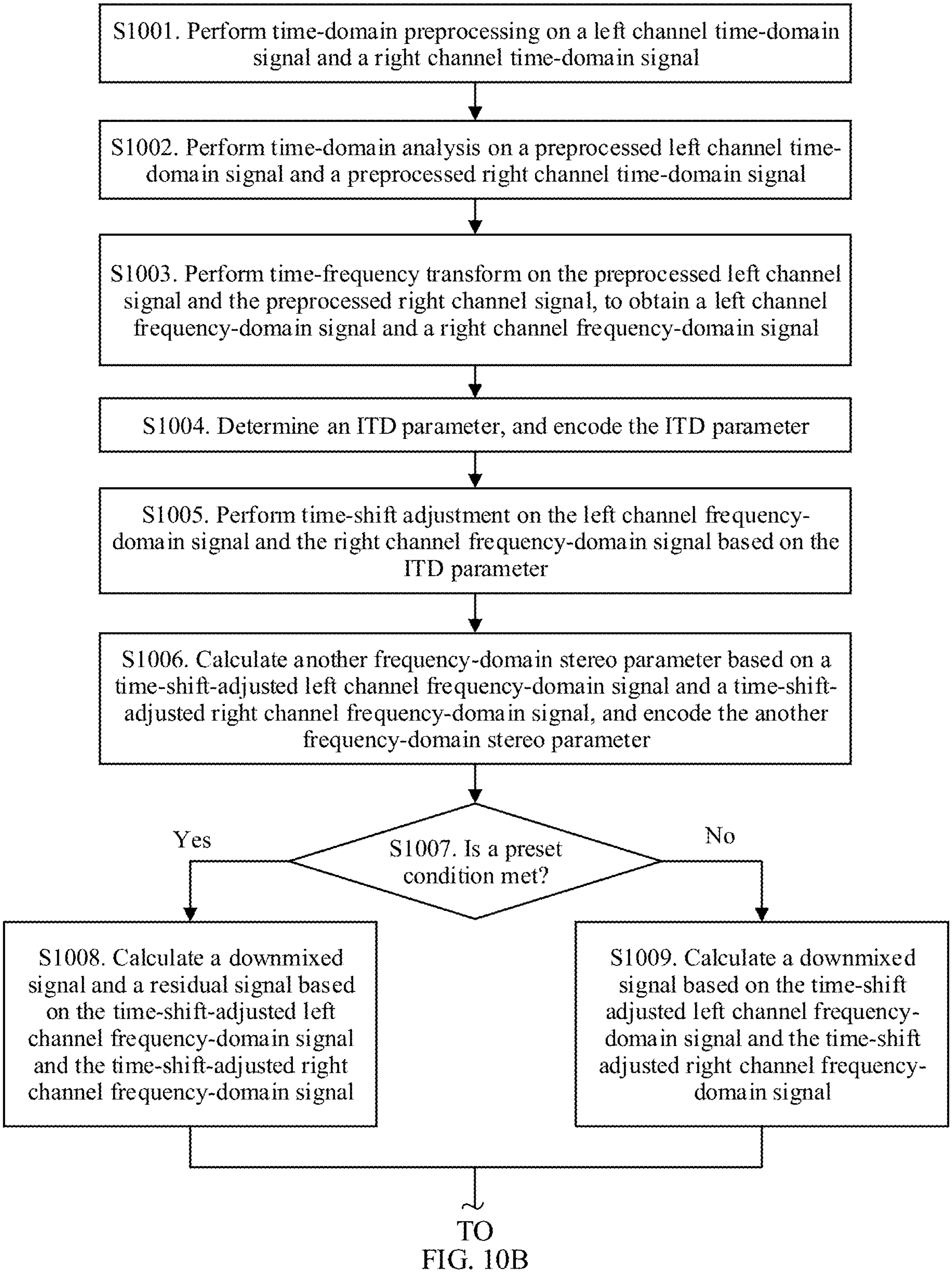
FIG. 10A and FIG. 10B are a schematic flowchart of a stereo signal encoding method according to an embodiment of this application.
Figure 10B:
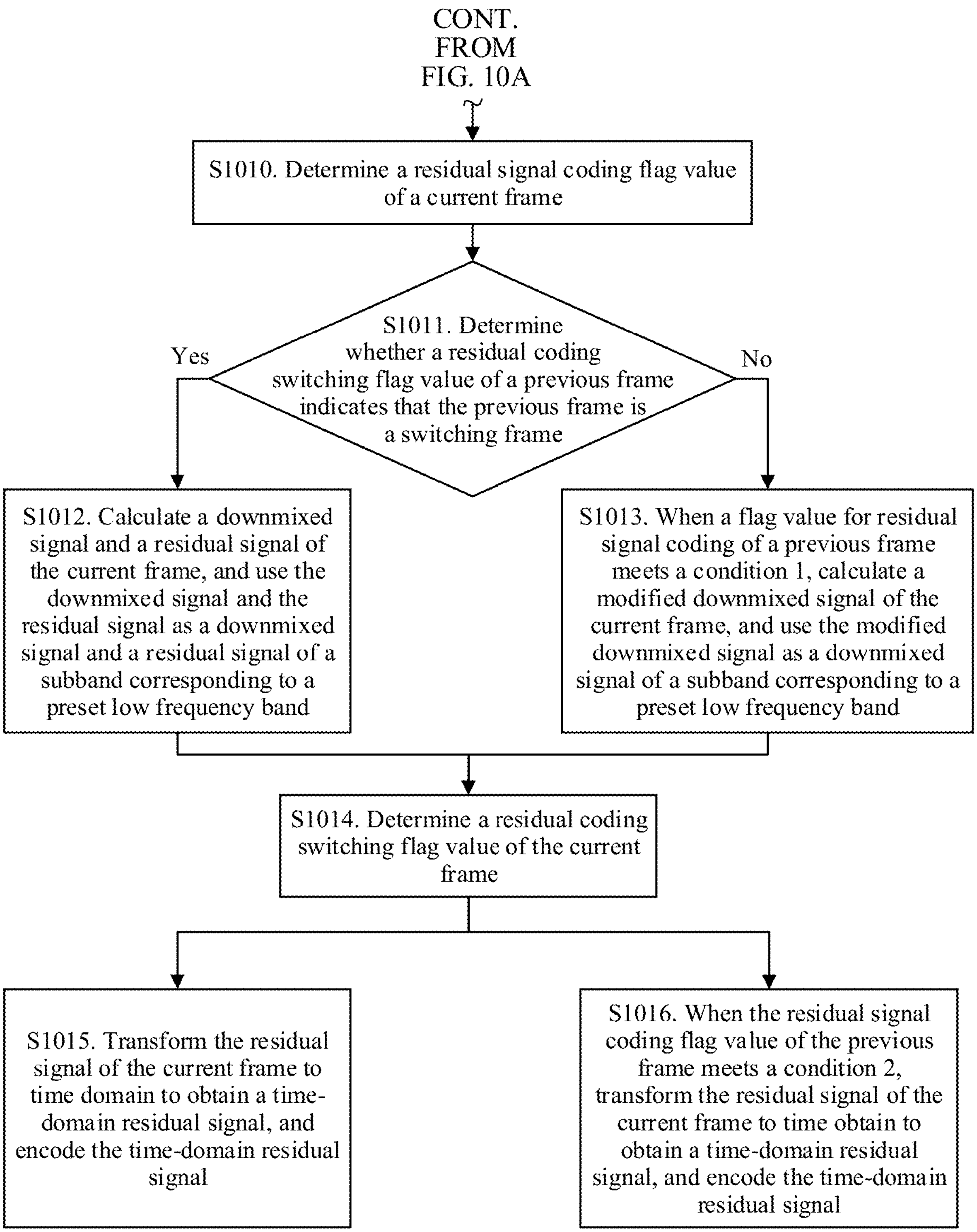

FIG. 10A and FIG. 10B are a schematic flowchart of a stereo signal encoding method according to an embodiment of this application by using the following example. Both a first target frame and a second target frame are previous frames of a current frame; a residual signal coding parameter of the second target frame is used to represent an energy ratio of a downmixed signal of the second target frame to a residual signal of the second target frame; and an inter-frame energy fluctuation parameter of the second target frame is used to represent a ratio of total energy of the downmixed signal of the second target frame and the residual signal of the second target frame to total energy of a downmixed signal of a previous frame of the second target frame and a residual signal of the previous frame of the second target frame. The method may be performed by an encoder or performed by a device having a stereo signal encoding function. The method may include S1001 to S1016.

For S1001 to S1009, refer to S701 to S709. Details are not described herein again.

S1010. Determine a residual coding flag value of the current frame. For this operation, refer to related content in S710. Details are not described herein again.

S1011. Determine whether a residual coding switching flag value of the previous frame indicates that the previous frame is a switching frame. If the residual coding switching flag value of the previous frame indicates that the previous frame is a switching frame, S1012 is performed; or if the residual coding switching flag value of the previous frame indicates that the previous frame is not a switching frame, S1013 is performed.

For S1012, refer to S712. For example, a to-be-encoded downmixed signal of a subband b in a subframe i in the current frame meets the following:

$$\overline{DMX_{i,b}}(k) = DMX_{i,b}(k) + (1 - \text{switch\_fade\_factor}) * \text{DMX\_comp}_{i,b}(k),$$

where $\text{DMX\_comp}_{i,b}(k)$ represents a compensated downmixed signal of the subband b in the subframe i; b represents an initial downmixed signal of the subband b in the subframe i; $\overline{DMX_{i,b}}(k)$ represents a to-be-encoded downmixed signal of a switching frame of the subband b in the subframe i; k represents a frequency bin index value, where k∈[band_limits(b), band_limits(b+1)−1], where band_limits(b) represents a minimum frequency bin index value of the subband b; and switch_fade_factor represents a switch fade-in/fade-out factor of the previous frame.

For example, a to-be-encoded residual signal of the subband b in the subframe i in the current frame meets the following:

$$\overline{RES_{i,b}}(k) = \text{switch\_fade\_factor} * RES'_{i,b}(k),$$

where $RES'_{i,b}(k)$ represents an initial residual signal of the subband b in the subframe i; $\overline{RES_{i,b}}(k)$ represents a to-be-encoded residual signal of a switching frame of the subband b in the subframe i; k is a frequency bin index value; k∈[band_limits(b), band_limits(b+1)−1], where band_limits(b) represents a minimum frequency bin index value of the subband b; and switch_fade_factor represents a switch fade-in/fade-out factor of the previous frame.

For example, $\overline{DMX_{i,b}}(k)=DMX_{i,b}(k)+0.5*\text{DMX\_comp}_{i,b}(k)$ and $\overline{RES_i}(k)=0.5*RES'_i(k)$.

S1013. When a residual coding flag value of the previous frame meets a condition 1, calculate a modified downmixed signal of the current frame, and use the modified downmixed signal as a downmixed signal of a subband corresponding to a preset low frequency band.

The condition 1 may include that the residual coding flag value of the previous frame indicates that a residual signal of the previous frame does not need to be encoded.

For example, when the residual signal coding flag of the previous frame is prev_res_cod_mode_flag, that the residual coding flag value of the previous frame meets the condition 1 may be equivalent to that prev_res_cod_mode_flag is equal to 0.

For related content of calculating the modified downmixed signal of the current frame and the subband corresponding to the preset frequency band, refer to S713, and details are not described herein again.

S1014. Determine a residual coding switching flag value of the current frame. For this operation, refer to related content in S710. Details are not described herein again.

For S1015, refer to S713. Details are not described herein again.

S1016. If the residual coding flag value of the previous frame meets a condition 2, transform the residual signal of the current frame to time domain to obtain a time-domain residual signal, and encode the time-domain residual signal by using a corresponding encoding method.

For example, the condition 2 is to encode a residual signal. If the residual coding flag value of the previous frame indicates that the residual signal is to be encoded, the residual signal of the current frame is transformed to time domain to obtain the time-domain residual signal, and the time-domain residual signal is encoded by using a corresponding encoding method.

If frame division processing is performed on each frame of signal, and band division processing is performed on each subframe, residual signals of all subbands of each subframe may be combined to constitute a residual signal of the subframe i.

The residual signal of the subframe i is transformed to time domain to obtain the time-domain residual signal through inverse discrete Fourier transform, and an overlap-add method is used for processing between subframes, to obtain the time-domain residual signal of the current frame.

The time-domain residual signal of the current frame may be encoded by using the prior art to obtain a residual signal encoded bitstream, and the residual signal encoded bitstream is written into a stereo encoded bitstream.

Figure 11A:
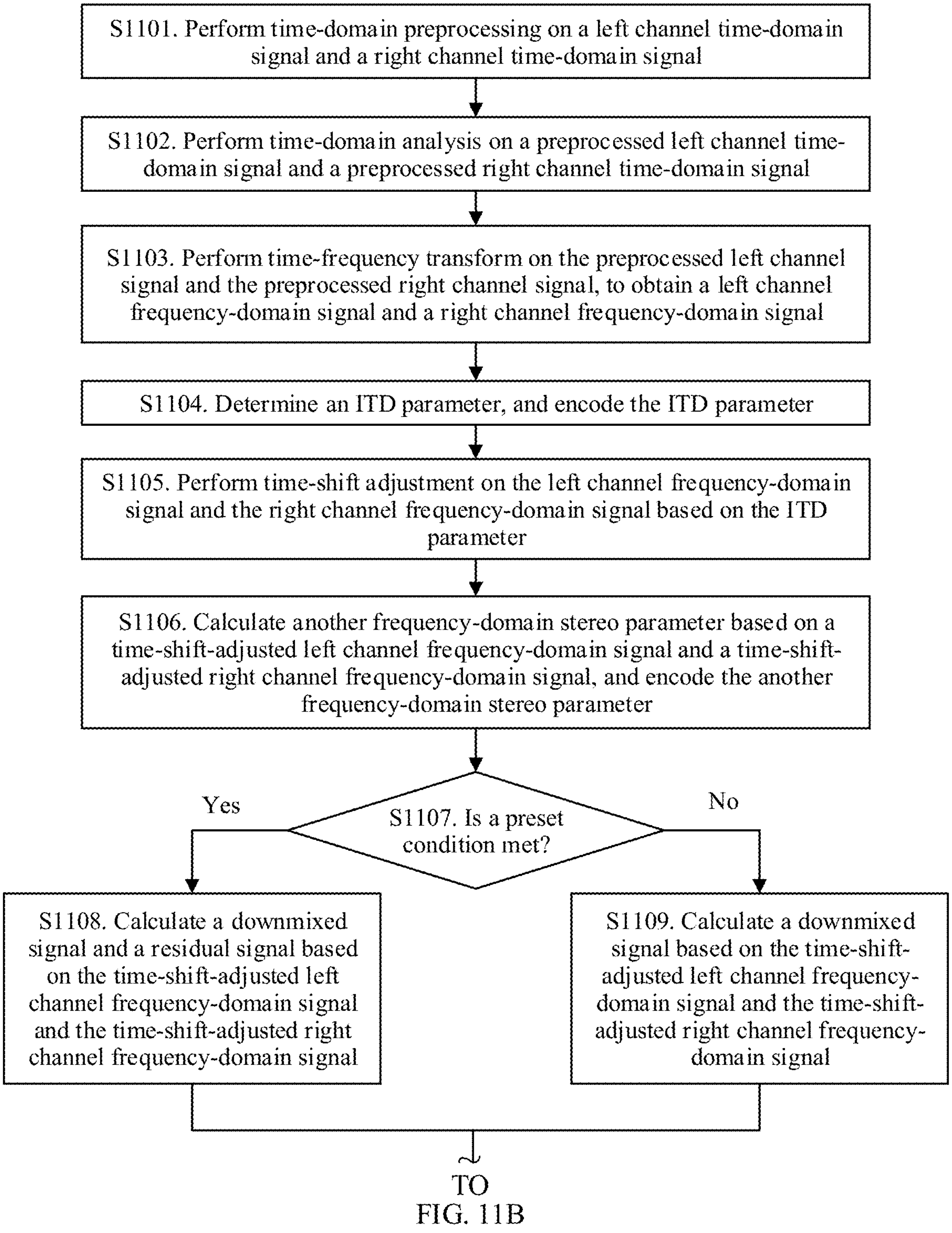
FIG. 11A and FIG. 11B are a schematic flowchart of a stereo signal encoding method according to an embodiment of this application.
Figure 11B:
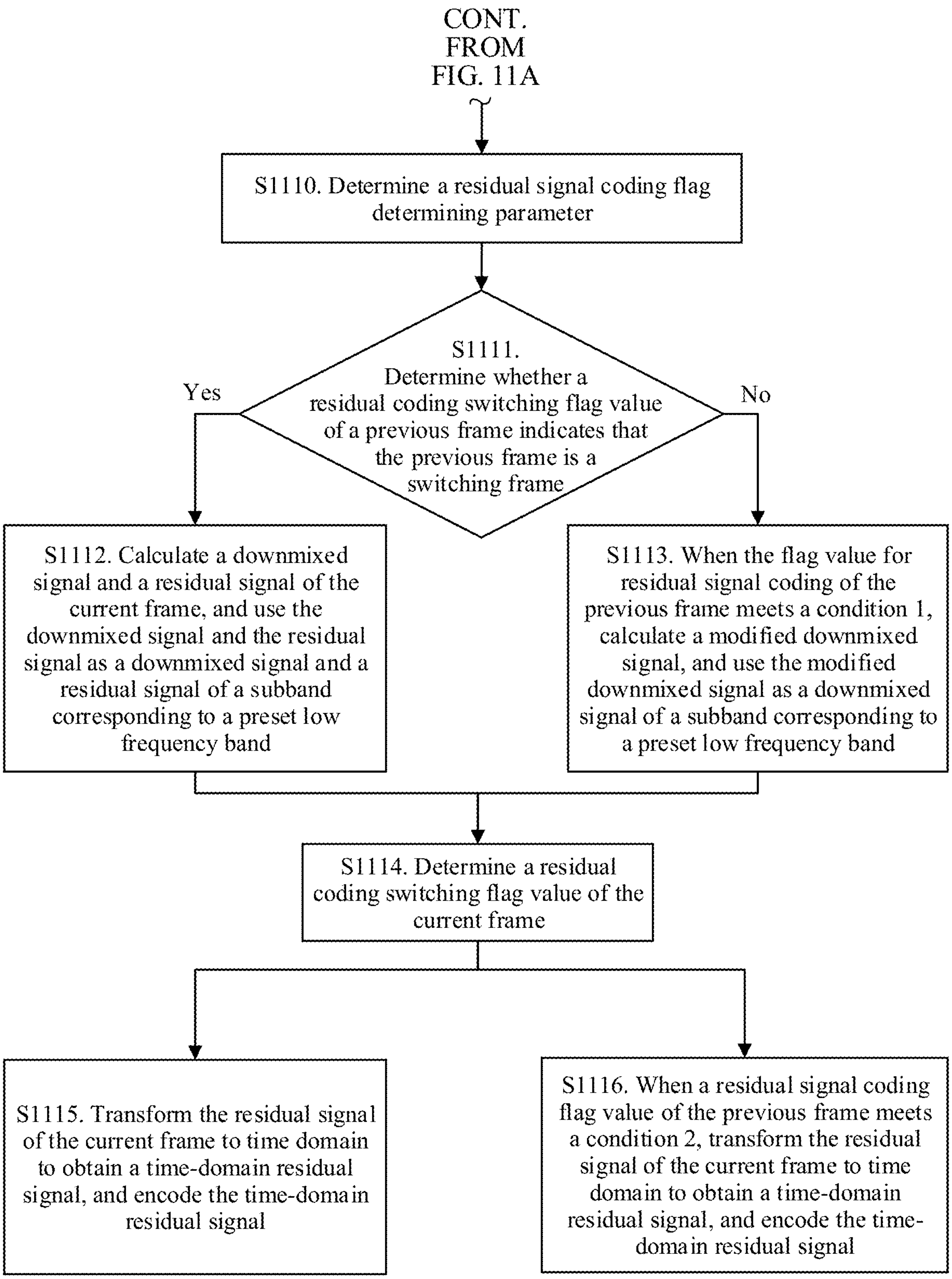

FIG. 11A and FIG. 11B are a schematic flowchart of a stereo signal encoding method according to another embodiment of this application by using the following example. Both a first target frame and a second target frame are previous frames of a current frame; a residual signal coding parameter of the second target frame is used to represent an energy ratio of a downmixed signal of the second target frame to a residual signal of the second target frame; and an inter-frame energy fluctuation parameter of the second target frame is used to represent a ratio of total energy of the downmixed signal of the second target frame and the residual signal of the second target frame to total energy of a downmixed signal of a previous frame of the second target frame and a residual signal of the previous frame of the second target frame. The method may be performed by an encoder or performed by a device having a stereo signal encoding function. The method may include S1101 to S1116.

For S1101 to S1109, refer to S1001 to S1009. Details are not described herein again.

S1110. Calculate a residual signal coding parameter of the current frame and an inter-frame energy fluctuation parameter of the current frame.

For a method for calculating the residual signal coding parameter of the current frame and the inter-frame energy fluctuation parameter of the current frame, refer to S620. Details are not described herein again.

S1111. Determine whether a residual coding switching flag value of the previous frame indicates that the previous frame is a switching frame. If the residual coding switching flag value of the previous frame indicates that the previous frame is a switching frame, S1112 is performed; or if the residual coding switching flag value of the previous frame indicates that the previous frame is not a switching frame, S1113 is performed.

For S1112 and S1113, refer to S1012 and S1013. Details are not described herein again.

For S1114 to S1116, refer to S1014 to S1016. Details are not described herein again.

Figure 12:
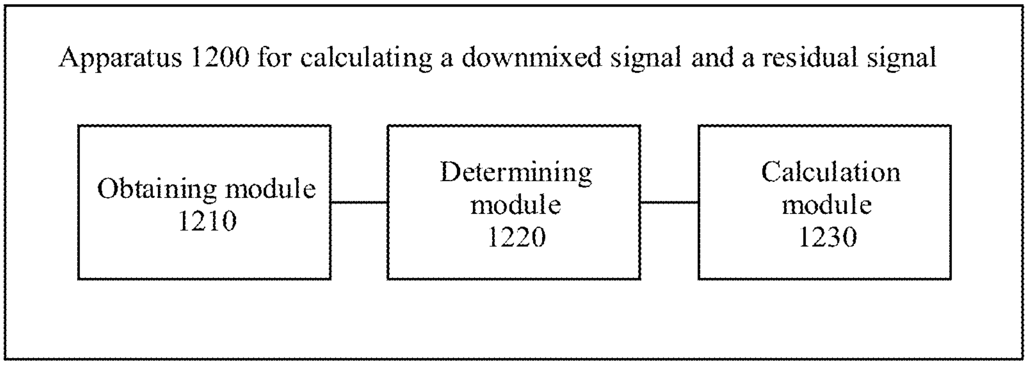
FIG. 12 is a schematic structural diagram of an apparatus for calculating a downmixed signal and a residual signal according to an embodiment of this application.

FIG. 12 is a schematic structural diagram of an apparatus for calculating a downmixed signal and a residual signal according to an embodiment of this application. It should be understood that an apparatus 1200 shown in FIG. 12 is merely an example.

The apparatus 1200 for calculating a downmixed signal and a residual signal may include an obtaining module 1210, a determining module 1220, and a calculation module 1230.

In an embodiment, the obtaining module 1210, the determining module 1220, and the calculation module 1230 may all be included in the encoding component 110 of the mobile terminal 130.

In an embodiment, the obtaining module 1210 may be the collection component 131 of the mobile terminal 130, and the determining module 1220 and the calculation module 1230 may be included in the encoding component 110 of the mobile terminal 130.

The obtaining module 1210 is configured to obtain an initial downmixed signal and an initial residual signal of a subband corresponding to a preset frequency band in a current frame of an audio signal, where the audio signal is a stereo signal.

The determining module 1220 is configured to determine whether a first target frame of the audio signal is a switching frame, where the first target frame is the current frame or a previous frame of the current frame.

The calculation module 1230 is configured to: if the first target frame is a switching frame, calculate, based on a switch fade-in/fade-out factor of a second target frame, the initial downmixed signal, and the initial residual signal, a to-be-encoded downmixed signal and a to-be-encoded residual signal of the subband corresponding to the preset frequency band in the current frame, where the second target frame is the current frame or the previous frame of the current frame, and the switch fade-in/fade-out factor of the second target frame is determined based on a residual signal coding parameter of the second target frame and at least one of an inter-frame energy fluctuation parameter or an inter-frame amplitude fluctuation parameter of the second target frame; and the residual signal coding parameter of the second target frame is used to represent an energy relationship between a downmixed signal and a residual signal of the second target frame, and the inter-frame energy fluctuation parameter or the inter-frame amplitude fluctuation parameter of the second target frame is used to represent an energy or amplitude relationship between a signal of the second target frame and signals of M frames previous to the second target frame, where M is a positive integer.

In an embodiment, the residual signal coding parameter of the second target frame is used to represent an energy difference between the downmixed signal of the second target frame and the residual signal of the second target frame;

the residual signal coding parameter of the second target frame is used to represent an energy difference between the downmixed signal of the second target frame and the residual signal of the second target frame; or the residual signal coding parameter of the second target frame is used to represent a logarithmic energy difference between the downmixed signal of the second target frame and the residual signal of the second target frame.

In an embodiment, the inter-frame energy fluctuation parameter of the second target frame is used to represent a ratio of total energy of the downmixed signal of the second target frame and the residual signal of the second target frame to total energy of a downmixed signal of a previous frame of the second target frame and a residual signal of the previous frame of the second target frame, or the inter-frame energy fluctuation parameter of the second target frame is used to represent a difference between total energy of the downmixed signal of the second target frame and the residual signal of the second target frame and total energy of a downmixed signal of a previous frame of the second target frame and a residual signal of the previous frame of the second target frame;

the inter-frame energy fluctuation parameter of the second target frame is used to represent a difference between a logarithm of total energy of the downmixed signal of the second target frame and the residual signal of the second target frame and a logarithm of total energy of a downmixed signal of a previous frame of the second target frame and a residual signal of the previous frame of the second target frame;

the inter-frame energy fluctuation parameter of the second target frame is used to represent a ratio of energy of the downmixed signal of the second target frame to energy of a downmixed signal of a previous frame of the second target frame, or the inter-frame energy fluctuation parameter of the second target frame is used to represent a difference between energy of the downmixed signal of the second target frame and energy of a downmixed signal of a previous frame of the second target frame;

the inter-frame energy fluctuation parameter of the second target frame is used to represent a difference between a logarithm of energy of the downmixed signal of the second target frame and a logarithm of energy of a downmixed signal of a previous frame of the second target frame;

the inter-frame energy fluctuation parameter of the second target frame is used to represent a ratio of energy of the residual signal of the second target frame to energy of a residual signal of a previous frame of the second target frame, or the inter-frame energy fluctuation parameter of the second target frame is used to represent a difference between energy of the residual signal of the second target frame and energy of a residual signal of a previous frame of the second target frame; or the inter-frame energy fluctuation parameter of the second target frame is used to represent a difference between a logarithm of energy of the residual signal of the second target frame and a logarithm of energy of a residual signal of a previous frame of the second target frame.

In an embodiment, the inter-frame amplitude fluctuation parameter of the second target frame is used to represent a ratio of a sum of an amplitude sum of the downmixed signal of the second target frame and an amplitude sum of the residual signal of the second target frame to a sum of an amplitude sum of the downmixed signal of the previous frame of the second target frame and an amplitude sum of the residual signal of the previous frame of the second target frame, or the inter-frame amplitude fluctuation parameter of the second target frame is used to represent a difference between and a sum of an amplitude sum of the downmixed signal of the second target frame and an amplitude sum of the residual signal of the second target frame between a sum of an amplitude sum of the downmixed signal of the previous frame of the second target frame and an amplitude sum of the residual signal of the previous frame of the second target frame;

the inter-frame amplitude fluctuation parameter of the second target frame is used to represent a difference between a logarithm of a sum of an amplitude sum of the downmixed signal of the second target frame and an amplitude sum of the residual signal of the second target frame and a logarithm of a sum of an amplitude sum of the downmixed signal of the previous frame of the second target frame and an amplitude sum of the residual signal of the previous frame of the second target frame of the residual signal of the second target frame and a logarithm of a sum of an amplitude sum of the downmixed signal of the previous frame of the second target frame and an amplitude sum of the residual signal of the previous frame of the second target frame;

the inter-frame amplitude fluctuation parameter of the second target frame is used to represent a ratio of an amplitude sum of the downmixed signal of the second target frame to an amplitude sum of the downmixed signal of the previous frame of the second target frame, or the inter-frame amplitude fluctuation parameter of the second target frame is used to represent a difference between an amplitude sum of the downmixed signal of the second target frame and an amplitude sum of the downmixed signal of the previous frame of the second target frame;

the inter-frame amplitude fluctuation parameter of the second target frame is used to represent a difference between a logarithm of an amplitude sum of the downmixed signal of the second target frame and a logarithm of an amplitude sum of the downmixed signal of the previous frame of the second target frame;

the inter-frame amplitude fluctuation parameter of the second target frame is used to represent a ratio of an amplitude sum of the residual signal of the second target frame to an amplitude sum of the residual signal of the previous frame of the second target frame, or the inter-frame amplitude fluctuation parameter of the second target frame is used to represent a difference between an amplitude sum of the residual signal of the second target frame and an amplitude sum of the residual signal of the previous frame of the second target frame; or the inter-frame amplitude fluctuation parameter of the second target frame is used to represent a difference between a logarithm of an amplitude sum of the residual signal of the second target frame and a logarithm of an amplitude sum of the residual signal of the previous frame of the second target frame.

In some possible implementations, the calculation module is configured to calculate the switch fade-in/fade-out factor of the second target frame in the following manner:

when frame_nrg_ratio>NRG_TH1 and res_dmx_ratio<RATIO_TH1, switch_fade_factor=FACTOR_1.

when frame_nrg_ratio<NRG_TH2 and res_dmx_ratio>RATIO_TH2, switch_fade_factor=FACTOR_2; or in another case, switch_fade_factor=FACTOR_3; where frame_nrg_ratio represents the inter-frame energy fluctuation parameter or the inter-frame amplitude fluctuation parameter of the second target frame; NRG_TH1 represents a preset first threshold of the inter-frame energy fluctuation parameter or the inter-frame amplitude fluctuation parameter; NRG_TH2 represents a preset second threshold of the inter-frame energy fluctuation parameter or the inter-frame amplitude fluctuation parameter; res_dmx_ratio represents the residual signal coding parameter of the second target frame; RATIO_TH1 represents a preset first threshold of the residual signal coding parameter; RATIO_TH2 represents a preset second threshold of the residual signal coding parameter; switch_fade_factor represents the switch fade-in/fade-out factor of the second target frame; and FACTOR_1, FACTOR_2, and FACTOR_3 represent preset values; and NRG_TH1>NRG_TH2, RATIO_TH1<RATIO_TH2, and FACTOR_1>FACTOR_3>FACTOR_2.

In an embodiment, FADE_FACTOR_3=0.5.

In an embodiment, FADE_FACTOR_1=0.75.

In an embodiment, FADE_FACTOR_2=0.25.

In an embodiment, the calculation module is configured to calculate the switch fade-in/fade-out factor of the second target frame in the following manner:

when frame_nrg_ratio>NRG_TH1 and res_dmx_ratio<RATIO_TH1, $$\text{switch\_fade\_factor} = \left(1 - \frac{1}{\text{frame\_nrg\_ratio}}\right) * (1 - \text{rem\_dmx\_ratio}) * \text{FADE\_FACTOR\_1};$$

when frame_nrg_ratio<NRG_TH2 and res_dmx_ratio>RATIO_TH2, switch_fade_factor=(1−frame_nrg_ratio)*rem_dmx_ratio*FADE_FACTOR_2; or in another case, switch_fade_factor=FADE_FACTOR_3; where frame_nrg_ratio represents the inter-frame energy fluctuation parameter or the inter-frame amplitude fluctuation parameter of the second target frame; NRG_TH1 represents a first threshold of the inter-frame energy fluctuation parameter or the inter-frame amplitude fluctuation parameter; NRG_TH2 represents a preset second threshold of the inter-frame energy fluctuation parameter or the inter-frame amplitude fluctuation parameter; res_dmx_ratio represents the residual signal coding parameter of the second target frame; RATIO_TH1 represents a preset first threshold of the residual signal coding parameter; RATIO_TH2 represents a preset second threshold of the residual signal coding parameter; switch_fade_factor represents the switch fade-in/fade-out factor of the second target frame; and FADE_FACTOR_1, FADE_FACTOR_2, and FADE_FACTOR_3 represent preset values; and NRG_TH1>NRG_TH2, RATIO_TH1<RATIO_TH2, and FADE_FACTOR_1>FADE_FACTOR_3>FADE_FACTOR_2.

In an embodiment, FADE_FACTOR_3=0.5.

In an embodiment, FADE_FACTOR_1=0.75.

In an embodiment, FADE_FACTOR_2=0.25.

In an embodiment, the calculation module is specifically configured to:

calculate, according to formula $\overline{DMX_{i,b}}(k)=DMX_{i,b}(k)+(1-\text{switch\_fade\_factor})*DMX\_comp_{i,b}(k)$ the to-be-encoded downmixed signal of the subband corresponding to the preset frequency band; and calculate, according to formula $\overline{RES_{i,b}}(k)=\text{switch\_fade\_factor}*RES'_{i,b}(k)$ the to-be-encoded residual signal of the subband corresponding to the preset frequency band; where $\overline{DMX_{i,b}}(k)$ represents a to-be-encoded downmixed signal of a subband b in a subframe i in the current frame; $DMX_{i,b}(k)$ represents an initial downmixed signal of the subband b in the subframe i in the current frame; switch_fade_factor represents the switch fade-in/fade-out factor; $DMX\_comp_{i,b}(k)$ represents a compensated downmixed signal of the subband b in the subframe i in the current frame; $RES'_{i,b}(k)$ represents an initial residual signal of the subband b in the subframe i in the current frame; $\overline{RES_{i,b}}(k)$ represents a to-be-encoded residual signal of the subband b in the subframe i in the current frame; the subband b in the subframe i in the current frame is a subband in the at least one subband corresponding to the preset frequency band; k represents a frequency bin index of the subband b in the subframe i in the current frame; and $0 \le i \le P-1$, where P represents a quantity of subframes included in the current frame.

In an embodiment, $Th1 \le b \le Th2$, $Th1 < b \le Th2$, $Th1 \le b < Th2$, or $Th1 < b < Th2$, where Th1 represents an index value of a subband with a smallest index value in the subband corresponding to the preset frequency band, Th2 represents an index value of a subband with a largest index value in the subband corresponding to the preset frequency band, and $0 \le Th1 < Th2 \le M-1$, where M represents a quantity of subbands corresponding to the preset frequency band, and $M \ge 2$.

In an embodiment, the determining module is specifically configured to:

determine, based on a residual coding switching flag value of the first target frame, whether the first target frame is a switching frame.

In an embodiment, when a residual coding flag value of the first target frame is unequal to a residual coding flag value of a previous frame of the first target frame, the residual coding switching flag value of the first target frame indicates that the first target frame is a switching frame;

when a residual coding flag value of the first target frame is unequal to a residual coding flag value of a previous frame of the first target frame, and a modification flag value of the residual coding flag of the previous frame of the first target frame indicates that the residual coding flag value of the previous frame of the first target frame has not been modified, the residual coding switching flag value of the first target frame indicates that the first target frame is a switching frame; or when a residual coding flag value of the first target frame is unequal to a residual coding flag value of a previous frame of the first target frame, and a residual coding switching flag of the previous frame of the first target frame indicates that the previous frame of the first target frame is not a switching frame, the residual coding switching flag value of the first target frame indicates that the first target frame is a switching frame; where the residual coding flag value of the first target frame is used to indicate whether a residual signal of the first target frame needs to be encoded, and the residual coding flag value of the previous frame of the first target frame is used to indicate whether a residual signal of the previous frame of the first target frame needs to be encoded.

In an embodiment, the determining module is specifically configured to:

when a residual coding flag value of the first target frame is unequal to a residual coding flag value of a previous frame of the first target frame, determine that the first target frame is a switching frame, where the residual coding flag value of the first target frame is used to indicate whether a residual signal of the first target frame needs to be encoded, and the residual coding flag value of the previous frame of the first target frame is used to indicate whether a residual signal of the previous frame of the first target frame needs to be encoded.

Figure 13:
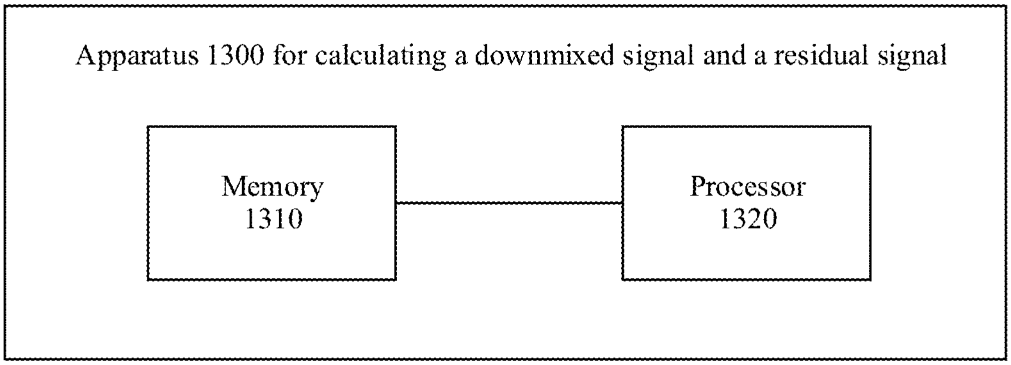
FIG. 13 is a schematic structural diagram of an apparatus for calculating a downmixed signal and a residual signal according to another embodiment of this application.

FIG. 13 is a schematic structural diagram of an apparatus for calculating a downmixed signal and a residual signal according to an embodiment of this application. It should be understood that an apparatus 1300 shown in FIG. 13 is merely an example.

A memory 1310 is configured to store a program.

A processor 1320 is configured to execute the program stored in the memory 1310, where when executing the program stored in the memory, the processor 1320 is specifically configured to:

obtain an initial downmixed signal and an initial residual signal of a subband corresponding to a preset frequency band in a current frame of an audio signal, where the audio signal is a stereo signal;

determine whether a first target frame of the audio signal is a switching frame, where the first target frame is the current frame or a previous frame of the current frame; and if the first target frame is a switching frame, calculate, based on a switch fade-in/fade-out factor of a second target frame, the initial downmixed signal and the initial residual signal, a to-be-encoded downmixed signal and a to-be-encoded residual signal of the subband corresponding to the preset frequency band in the current frame, where the second target frame is the current frame or the previous frame of the first target frame, and the switch fade-in/fade-out factor of the second target frame is determined based on a residual signal coding parameter of the second target frame and at least one of an inter-frame energy fluctuation parameter or an inter-frame amplitude fluctuation parameter of the second target frame; and the residual signal coding parameter of the second target frame is used to represent an energy relationship between a downmixed signal and a residual signal of the second target frame, and the inter-frame energy fluctuation parameter or the inter-frame amplitude fluctuation parameter of the second target frame is used to represent an energy or amplitude relationship between a signal of the second target frame and signals of M frames previous to the second target frame, where M is a positive integer.

In an embodiment, the residual signal coding parameter of the second target frame is used to represent an energy ratio of the downmixed signal of the second target frame to the residual signal of the second target frame;

the residual signal coding parameter of the second target frame is used to represent an energy difference between the downmixed signal of the second target frame and the residual signal of the second target frame; or the residual signal coding parameter of the second target frame is used to represent a logarithmic energy difference between the downmixed signal of the second target frame and the residual signal of the second target frame.

The inter-frame energy fluctuation parameter of the second target frame is used to represent a ratio of total energy of the downmixed signal of the second target frame and the residual signal of the second target frame to total energy of a downmixed signal of a previous frame of the second target frame and a residual signal of the previous frame of the second target frame, or the inter-frame energy fluctuation parameter of the second target frame is used to represent a difference between total energy of the downmixed signal of the second target frame and the residual signal of the second target frame and total energy of a downmixed signal of a previous frame of the second target frame and a residual signal of the previous frame of the second target frame;

the inter-frame energy fluctuation parameter of the second target frame may be used to represent a difference between a logarithm of total energy of the downmixed signal of the second target frame and the residual signal of the second target frame and a logarithm of total energy of a downmixed signal of a previous frame of the second target frame and a residual signal of the previous frame of the second target frame;

the inter-frame energy fluctuation parameter of the second target frame is used to represent a ratio of energy of the downmixed signal of the second target frame to energy of a downmixed signal of a previous frame of the second target frame, or the inter-frame energy fluctuation parameter of the second target frame is used to represent a difference between energy of the downmixed signal of the second target frame and energy of a downmixed signal of a previous frame of the second target frame;

the inter-frame energy fluctuation parameter of the second target frame is used to represent a difference between a logarithm of energy of the downmixed signal of the second target frame and a logarithm of energy of a downmixed signal of a previous frame of the second target frame;

the inter-frame energy fluctuation parameter of the second target frame is used to represent a ratio of energy of the residual signal of the second target frame to energy of a residual signal of a previous frame of the second target frame, or the inter-frame energy fluctuation parameter of the second target frame is used to represent a difference between energy of the residual signal of the second target frame and energy of a residual signal of a previous frame of the second target frame; or the inter-frame energy fluctuation parameter of the second target frame is used to represent a difference between a logarithm of energy of the residual signal of the second target frame and a logarithm of energy of a residual signal of a previous frame of the second target frame.

Optionally, the inter-frame amplitude fluctuation parameter of the second target frame is used to represent a ratio of a sum of an amplitude sum of the downmixed signal of the second target frame and an amplitude sum of the residual signal of the second target frame to a sum of an amplitude sum of the downmixed signal of the previous frame of the second target frame and an amplitude sum of the residual signal of the previous frame of the second target frame, or the inter-frame amplitude fluctuation parameter of the second target frame is used to represent a difference between a sum of an amplitude sum of the downmixed signal of the second target frame and an amplitude sum of the residual signal of the second target frame and a sum of an amplitude sum of the downmixed signal of the previous frame of the second target frame and an amplitude sum of the residual signal of the previous frame of the second target frame;

the inter-frame amplitude fluctuation parameter of the second target frame is used to represent a difference between a logarithm of a sum of an amplitude sum of the downmixed signal of the second target frame and an amplitude sum of the residual signal of the second target frame and a logarithm of a sum of an amplitude sum of the downmixed signal of the previous frame of the second target frame and an amplitude sum of the residual signal of the previous frame of the second target frame;

the inter-frame amplitude fluctuation parameter of the second target frame is used to represent a ratio of an amplitude sum of the downmixed signal of the second target frame to an amplitude sum of the downmixed signal of the previous frame of the second target frame, or the inter-frame amplitude fluctuation parameter of the second target frame is used to represent a difference between an amplitude sum of the downmixed signal of the second target frame and an amplitude sum of the downmixed signal of the previous frame of the second target frame;

the inter-frame amplitude fluctuation parameter of the second target frame is used to represent a difference between a logarithm of an amplitude sum of the downmixed signal of the second target frame and a logarithm of an amplitude sum of the downmixed signal of the previous frame of the second target frame;

the inter-frame amplitude fluctuation parameter of the second target frame is used to represent a ratio of an amplitude sum of the residual signal of the second target frame to an amplitude sum of the residual signal of the previous frame of the second target frame, or the inter-frame amplitude fluctuation parameter of the second target frame is used to represent a difference between an amplitude sum of the residual signal of the second target frame and an amplitude sum of the residual signal of the previous frame of the second target frame; or the inter-frame amplitude fluctuation parameter of the second target frame is used to represent a difference between a logarithm of an amplitude sum of the residual signal of the second target frame and a logarithm of an amplitude sum of the residual signal of the previous frame of the second target frame.

In an embodiment, the processor is configured to determine the switch fade-in/fade-out factor in the following manner:

when frame_nrg_ratio>NRG_TH1 and res_dmx_ratio<RATIO_TH1, switch_fade_factor=FACTOR_1;

when frame_nrg_ratio<NRG_TH2 and res_dmx_ratio>RATIO_TH2, switch_fade_factor=FACTOR_2; or in another case, switch_fade_factor=FACTOR_3; where frame_nrg_ratio represents the inter-frame energy fluctuation parameter or the inter-frame amplitude fluctuation parameter of the second target frame; NRG_TH1 represents a preset first threshold of the inter-frame energy fluctuation parameter or the inter-frame amplitude fluctuation parameter; NRG_TH2 represents a second threshold of the inter-frame energy fluctuation parameter or the inter-frame amplitude fluctuation parameter; res_dmx_ratio represents the residual signal coding parameter of the second target frame; RATIO_TH1 represents a preset first threshold of the residual signal coding parameter; RATIO_TH2 represents a preset second threshold of the residual signal coding parameter; switch_fade_factor represents the switch fade-in/fade-out factor of the second target frame; and FACTOR_1, FACTOR_2, and FACTOR_3 represent preset values; and NRG_TH1>NRG_TH2, RATIO_TH1<RATIO_TH2, and FACTOR_1>FACTOR_3>FACTOR_2.

In an embodiment, the processor is configured to determine the switch fade-in/fade-out factor in the following manner:

when frame_nrg_ratio>NRG_TH1 and res_dmx_ratio<RATIO_TH1, $$\text{switch\_fade\_factor} = \left(1 - \frac{1}{\text{frame\_nrg\_ratio}}\right) * (1 - \text{rem\_dmx\_ratio}) * \text{FADE\_FACTOR\_1};$$

when frame_nrg_ratio<NRG_TH2 and res_dmx_ratio>RATIO_TH2, switch_fade_factor=(1−frame_nrg_ratio)*rem_dmx_ratio*FADE_FACTOR_2; or in another case, switch_fade_factor=FADE_FACTOR_3; where frame_nrg_ratio represents the inter-frame energy fluctuation parameter or the inter-frame amplitude fluctuation parameter of the second target frame; NRG_TH1 represents a preset first threshold of the inter-frame energy fluctuation parameter or the inter-frame amplitude fluctuation parameter; NRG_TH2 represents a preset second threshold of the inter-frame energy fluctuation parameter or the inter-frame amplitude fluctuation parameter; res_dmx_ratio represents the residual signal coding parameter of the second target frame; RATIO_TH1 represents a preset first threshold of the residual signal coding parameter; RATIO_TH2 represents a preset second threshold of the residual signal coding parameter; switch_fade_factor represents the switch fade-in/fade-out factor of the second target frame; and FADE_FACTOR_1 FADE_FACTOR_2, and FADE_FACTOR_3 represent preset values of the switch fade-in/fade-out factor; and NRG_TH1>NRG_TH2, RATIO_TH1<RATIO_TH2, and FADE_FACTOR_1>FADE_FACTOR_3>FADE_FACTOR_2.

In an embodiment, FADE_FACTOR_3=0.5.

In an embodiment, FADE_FACTOR_1=0.75.

In an embodiment, FADE_FACTOR_2=0.25.

In an embodiment, the processor is configured to:

calculate the to-be-encoded downmixed signal according to formula $\overline{DMX_{i,b}}(k)=DMX_{i,b}(k)+(1-\text{switch\_fade\_factor})*DMX\_comp_{i,b}(k)$; and calculate the to-be-encoded residual signal according to formula $\overline{RES_{i,b}}(k)=\text{switch\_fade\_factor}*RES'_{i,b}(k)$ where $\overline{DMX_{i,b}}(k)$ represents the to-be-encoded downmixed signal of a subband b in a subframe i in the current frame; $DMX_{i,b}(k)$ represents an initial downmixed signal of the subband b in the subframe i in the current frame; switch_fade_factor represents the switch fade-in/fade-out factor; represents a compensated downmixed signal of the subband b in the subframe i in the current frame; $RES'_{i,b}(k)$ represents an initial residual signal of the subband b in the subframe i in the current frame; $\overline{RES_{i,b}}(k)$ represents a to-be-encoded residual signal of the subband b in the subframe i in the current frame; the subband b in the subframe i in the current frame is a subband in the at least one subband corresponding to the preset frequency band; k represents a frequency bin index of the subband b in the subframe i in the current frame; and $0 \le i \le P-1$, where P represents a quantity of subframes included in the current frame.

In an embodiment, $Th1 \le b \le Th2$, $Th1 < b \le Th2$, $Th1 \le b < Th2$, or $Th1 < b < Th2$, where Th1 represents an index value of a subband with a smallest index value in the subband corresponding to the preset frequency band, Th2 represents an index value of a subband with a largest index value in the subband corresponding to the preset frequency band, and $0 \le Th1 < Th2 \le M-1$, where M represents a quantity of subbands corresponding to the preset frequency band, and $M \ge 2$.

In an embodiment, the processor is configured to determine, based on a residual coding switching flag value of the first target frame, whether the first target frame is a switching frame.

In an embodiment, when a residual coding flag value of the first target frame is unequal to a residual coding flag value of a previous frame of the first target frame, the residual coding switching flag value of the first target frame indicates that the first target frame is a switching frame;

when a residual coding flag value of the first target frame is unequal to a residual coding flag value of a previous frame of the first target frame, and a modification flag value of the residual coding flag of the previous frame of the first target frame indicates that the residual coding flag value of the previous frame of the first target frame has not been modified, the residual coding switching flag value of the first target frame indicates that the first target frame is a switching frame; or when a residual coding flag value of the first target frame is unequal to a residual coding flag value of a previous frame of the first target frame, and a residual coding switching flag of the previous frame of the first target frame indicates that the previous frame of the first target frame is not a switching frame, the residual coding switching flag value of the first target frame indicates that the first target frame is a switching frame; where the residual coding flag value of the first target frame is used to indicate whether a residual signal of the first target frame needs to be encoded, and the residual coding flag value of the previous frame of the first target frame is used to indicate whether a residual signal of the previous frame of the first target frame needs to be encoded.

In an embodiment, the processor is configured to: when a residual coding flag value of the first target frame is unequal to a residual coding flag value of a previous frame of the first target frame, determine that the first target frame is a switching frame, where the residual coding flag value of the first target frame is used to indicate whether a residual signal of the first target frame needs to be encoded, and the residual coding flag value of the previous frame of the first target frame is used to indicate whether a residual signal of the previous frame of the first target frame needs to be encoded.

It should be understood that the apparatus 1300 for calculating a downmixed signal and a residual signal may be configured to perform the operations in the method shown in FIG. 6. For brevity, details are not described herein again.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by the person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that, the disclosed system, apparatus, and method may be implemented in another manner. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected depending on actual requirements to achieve the objectives of the solutions in the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or partially contribute to the prior art, or some of the technical solutions may be implemented in a form of a software product. The software product is stored in a storage medium, and includes several instructions for instructing a computer device (which may be a personal computer, a server, a network device, or the like) to perform all or some of the operations of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An audio signal encoding method, comprising:

obtaining an audio signal including at least two channel signals;

obtaining an initial residual signal of a subband of a current frame of the audio signal;

obtaining an initial downmixed signal of the subband;

determining whether a previous frame of the current frame is a switching frame; and when the previous frame is a switching frame, obtaining a switch fade-in/fade-out factor of the current frame based on a residual signal coding parameter of the current frame and an inter-frame energy fluctuation parameter of the current frame, wherein the residual signal coding parameter represents an energy relationship between a downmixed signal and a residual signal of the current frame, and the inter-frame energy fluctuation parameter represents an energy relationship between the current frame and the previous frame;

obtaining a processed downmixed signal based on the switch fade-in/fade-out factor and the initial downmixed signal;

obtaining a processed residual signal based on the switch fade-in/fade-out factor and the initial residual signal; and encoding the processed downmixed signal and the processed residual signal.

2. The method according to claim 1, wherein:

when frame_nrg_ratio>NRG_TH1 and res_dmx_ratio<RATIO_TH1 switch_fade_factor=FACTOR_1;

frame_nrg_ratio represents the inter-frame energy fluctuation parameter; NRG_TH1 represents a preset first threshold of the inter-frame energy fluctuation parameter; res_dmx_ratio represents the residual signal coding parameter of the previous frame; RATIO_TH1 represents a preset first threshold of the residual signal coding parameter; switch_fade_factor represents the switch fade-in/fade-out factor; and FACTOR_1 represents a preset value.

3. The method according to claim 1, wherein:

when frame_nrg_ratio>NRG_TH1 and res_dmx_ratio<RATIO_TH1, $$\text{switch\_fade\_factor} = \left(1 - \frac{1}{\text{frame\_nrg\_ratio}}\right) * (1 - \text{rem\_dmx\_ratio}) * \text{FADE\_FACTOR\_1};$$

when frame_nrg_ratio<NRG_TH2 and res_dmx_ratio>RATIO_TH2, switch_fade_factor=(1−frame_nrg_ratio)*rem_dmx_ratio*FADE_FACTOR_2; or switch_fade_factor=FADE_FACTOR_3;

frame_nrg_ratio represents the inter-frame energy fluctuation parameter; NRG_TH1 represents a preset first threshold of the inter-frame energy fluctuation parameter; NRG_TH2 represents a preset second threshold of the inter-frame energy fluctuation parameter; res_dmx_ratio represents the residual signal coding parameter of the previous frame; RATIO_TH1 represents a preset first threshold of the residual signal coding parameter; RATIO_TH2 represents a preset second threshold of the residual signal coding parameter; switch_fade_factor represents the switch fade-in/fade-out factor; and FADE_FACTOR_1, FADE_FACTOR_2 and FADE_FACTOR_3 represent preset values; and NRG_TH1>NRG_TH2, RATIO_TH1<RATIO_TH2, and, FADE_FACTOR_1>FADE_FACTOR_3>FADE_FACTOR_2.

4. The method according to claim 3, wherein FADE FACTOR_3=0.5.

5. The method according to claim 2, wherein FACTOR_1=0.75.

6. The method according to claim 3, wherein FADE FACTOR_2=0.25.

7. An audio signal encoder, comprising:

a processor; and a memory coupled to the processor and storing programming instructions, which when executed by the processor, cause the audio signal encoder to:

obtain an audio signal including at least two channel signals;

obtain an initial residual signal of a subband of a current frame of the audio signal;

obtain an initial downmixed signal of the subband;

determine whether a previous frame of the current frame is a switching frame; and when the previous frame is a switching frame, obtain a switch fade-in/fade-out factor of the current frame based on a residual signal coding parameter of the current frame and an inter-frame energy fluctuation parameter of the current frame, wherein the residual signal coding parameter represents an energy relationship between a downmixed signal and a residual signal of the current frame, and the inter-frame energy fluctuation parameter represents an energy relationship between the current frame and the previous frame;

obtain a processed downmixed signal based on the switch fade-in/fade-out factor and the initial downmixed signal;

obtain a processed residual signal based on the switch fade-in/fade-out factor and the initial residual signal; and encode the processed downmixed signal and the processed residual signal.

8. The audio signal encoder according to claim 7, wherein:

when frame_nrg_ratio>NRG_TH1 and res_dmx_ratio<RATIO_TH1, switch_fade_factor=FACTOR_1;

frame_nrg_ratio represents the inter-frame energy fluctuation parameter; NRG_TH1 represents a preset first threshold of the inter-frame energy fluctuation parameter; res_dmx_ratio represents the residual signal coding parameter of the previous frame; RATIO_TH1 represents a preset first threshold of the residual signal coding parameter; switch_fade_factor represents the switch fade-in/fade-out factor; and FACTOR_1 represents a preset value.

9. The audio signal encoder according to claim 7, wherein:

when frame_nrg_ratio>NRG_TH1 and res_dmx_ratio<RATIO_TH1, $$\text{switch\_fade\_factor} = \left(1 - \frac{1}{\text{frame\_nrg\_ratio}}\right) * (1 - \text{rem\_dmx\_ratio}) * \text{FADE\_FACTOR\_1};$$

when frame_nrg_ratio<NRG_TH2 and res_dmx_ratio>RATIO_TH2, switch_fade_factor=(1−frame_nrg_ratio)*rem_dmx_ratio*FADE_FACTOR_2; or switch_fade_factor=FADE_FACTOR_3;

frame_nrg_ratio represents the inter-frame energy fluctuation parameter; NRG_TH1 represents a preset first threshold of the inter-frame energy fluctuation parameter; NRG_TH2 represents a preset second threshold of the inter-frame energy fluctuation parameter; res_dmx_ratio represents the residual signal coding parameter of the previous frame; RATIO_TH1 represents a preset first threshold of the residual signal coding parameter; RATIO_TH2 represents a preset second threshold of the residual signal coding parameter; switch_fade_factor represents the switch fade-in/fade-out factor; and FADE_FACTOR_1, FADE_FACTOR_2, and FADE_FACTOR_3 represent preset values; and NRG_TH1>NRG_TH2, RATIO_TH1<RATIO_TH2 and, FADE_FACTOR_1>FADE_FACTOR_3>FADE_FACTOR_2.

10. The audio signal encoder according to claim 9, wherein FADE_FACTOR_3=0.5.

11. The audio signal encoder according to claim 8, wherein FACTOR_1=0.75.

12. The audio signal encoder according to claim 9, wherein FADE_FACTOR_2=0.25.

13. A non-transitory computer-readable storage medium storing computer instructions, which when executed by one or more processors, cause the one or more processors to perform operations, the operations comprising:

obtaining an audio signal including at least two channel signals;

obtaining an initial residual signal of a subband of a current frame of the audio signal;

obtaining an initial downmixed signal of the subband;

determining whether a previous frame of the current frame is a switching frame; and when the previous frame is a switching frame, obtaining a switch fade-in/fade-out factor of the current frame based on a residual signal coding parameter of the current frame and an inter-frame energy fluctuation parameter of the current frame, wherein the residual signal coding parameter represents an energy relationship between a downmixed signal and a residual signal of the current frame, and the inter-frame energy fluctuation parameter represents an energy relationship between the current frame and the previous frame;

obtaining a processed downmixed signal based on the switch fade-in/fade-out factor and the initial downmixed signal;

obtaining a processed residual signal based on the switch fade-in/fade-out factor and the initial residual signal; and encoding the processed downmixed signal and the processed residual signal.

14. The non-transitory computer-readable storage medium according to claim 13, wherein:

when frame_nrg_ratio>NRG_TH1 and res_dmx_ratio<RATIO_TH1, switch_fade_factor=FACTOR_1;

frame_nrg_ratio represents the inter-frame energy fluctuation parameter; NRG_TH1 represents a preset first threshold of the inter-frame energy fluctuation parameter; res_dmx_ratio represents the residual signal coding parameter of the previous frame; RATIO_TH1 represents a preset first threshold of the residual signal coding parameter; switch_fade_factor represents the switch fade-in/fade-out factor; and FACTOR_1 represents a preset value.

15. The non-transitory computer-readable storage medium according to claim 13, wherein:

when frame_nrg_ratio>NRG_TH1 and res_dmx_ratio<RATIO_TH1, $$\text{switch\_fade\_factor} = \left(1 - \frac{1}{\text{frame\_nrg\_ratio}}\right) * (1 - \text{rem\_dmx\_ratio}) * \text{FADE\_FACTOR\_1};$$

when frame_nrg_ratio<NRG_TH2 and res_dmx_ratio>RATIO_TH2, switch_fade_factor=(1−frame_nrg_ratio)*rem_dmx_ratio*FADE_FACTOR_2; or switch_fade_factor=FADE_FACTOR_3;

frame_nrg_ratio represents the inter-frame energy fluctuation parameter; NRG_TH1 represents a preset first threshold of the inter-frame energy fluctuation parameter; NRG_TH2 represents a preset second threshold of the inter-frame energy fluctuation parameter; res_dmx_ratio represents the residual signal coding parameter of the previous frame; RATIO_TH1 represents a preset first threshold of the residual signal coding parameter; RATIO_TH2 represents a preset second threshold of the residual signal coding parameter; switch_fade_factor represents the switch fade-in/fade-out factor; and FADE_FACTOR_1, FADE_FACTOR_2, and FADE_FACTOR_3 represent preset values; and NRG_TH1>NRG_TH2, RATIO_TH1<RATIO_TH2, and FADE_FACTOR_1>FADE_FACTOR_3>FADE_FACTOR_2.

16. The non-transitory computer-readable storage medium according to claim 15, wherein FADE_FACTOR_3=0.5.

17. The non-transitory computer-readable storage medium according to claim 14, wherein FACTOR_1=0.75.

18. The non-transitory computer-readable storage medium according to claim 15, wherein FADE_FACTOR_2=0.25.

* * * * *